(12) United States Patent
Henke et al.

(10) Patent No.: US 8,858,090 B2
(45) Date of Patent: Oct. 14, 2014

(54) FERRULE HOLDERS WITH AN INTEGRAL LEAD-IN TUBE EMPLOYED IN FIBER OPTIC CONNECTOR ASSEMBLIES, AND RELATED COMPONENTS, CONNECTORS, AND METHODS

(75) Inventors: Charles T. Henke, Boyd, TX (US); Louis E. Parkman, III, Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 235 days.

(21) Appl. No.: 13/488,771

(22) Filed: Jun. 5, 2012

(65) Prior Publication Data

US 2013/0322826 A1 Dec. 5, 2013

(51) Int. Cl.
G02B 6/36 (2006.01)
G02B 6/38 (2006.01)

(52) U.S. Cl.
CPC .................... *G02B 6/3834* (2013.01)
USPC .................. 385/60; 385/72; 385/78

(58) Field of Classification Search
None
See application file for complete search history.

(56) References Cited

U.S. PATENT DOCUMENTS

| | | | |
|---|---|---|---|
| 5,181,267 A | 1/1993 | Gerace et al. | 385/86 |
| 5,285,510 A * | 2/1994 | Slaney | 385/78 |
| 5,321,784 A | 6/1994 | Cubukciyan et al. | 385/78 |
| 6,173,097 B1 * | 1/2001 | Throckmorton et al. | 385/59 |
| 6,206,581 B1 | 3/2001 | Driscoll et al. | 385/78 |
| 6,287,018 B1 | 9/2001 | Andrews et al. | 385/60 |
| 6,293,710 B1 | 9/2001 | Lampert et al. | 385/78 |
| 6,325,547 B1 | 12/2001 | Cammons et al. | 385/76 |
| 7,104,702 B2 * | 9/2006 | Barnes et al. | 385/77 |
| 7,658,551 B1 | 2/2010 | Wu et al. | 385/78 |
| 7,708,469 B2 * | 5/2010 | Liu et al. | 385/66 |
| 7,881,576 B2 | 2/2011 | Melton et al. | 385/103 |
| 7,918,609 B2 | 4/2011 | Melton et al. | 385/62 |
| 7,997,806 B2 | 8/2011 | Nakagawa | 385/78 |
| 8,340,485 B2 * | 12/2012 | Danley et al. | 385/43 |
| 2003/0077045 A1 | 4/2003 | Fleenor et al. | 385/78 |
| 2004/0151437 A1 | 8/2004 | Marrs et al. | 385/78 |
| 2005/0213892 A1 | 9/2005 | Barnes et al. | 385/62 |

(Continued)

FOREIGN PATENT DOCUMENTS

| | | | | |
|---|---|---|---|---|
| DE | 20010478 U1 | 11/2000 | | F16B 1/00 |
| DE | 202010005308 U1 | 8/2010 | | H01R 13/58 |
| EP | 0803750 A1 | 10/1997 | | G02B 6/38 |

OTHER PUBLICATIONS

Patent Cooperation Treaty International Search Report, Application No. PCT/US2013/044083, Sep. 30, 2013, 4 pages.

*Primary Examiner* — Mike Stahl

(57) ABSTRACT

Ferrule holders with an integral lead-in tube employed in fiber optic connector assemblies, and related components, connectors, and methods are disclosed. By integrating the integral lead-in tube as part of the ferrule holder, the integral lead-in tube may be less expensive to manufacture and easier to install. The integral lead-in tube may also be less susceptible to inadvertent removal by friction with a bonding agent syringe or by vibration during shipment. The ferrule holder may include a ferrule holder body and integral lead-in tube. The integral lead-in tube may guide an optical fiber from a rear end of a fiber optic connector to an internal passage of the ferrule holder, where the optical fiber may be further guided to a ferrule for precise alignment. The integral lead-in tube may also protect the optical fiber during installation, shipment, and use in the fiber optic connector.

22 Claims, 22 Drawing Sheets

(56) References Cited

U.S. PATENT DOCUMENTS

| | | | |
|---|---|---|---|
| 2006/0115219 A1 | 6/2006 | Mudd et al. | 385/62 |
| 2007/0098331 A1 | 5/2007 | Mudd et al. | 385/86 |
| 2009/0214164 A1 | 8/2009 | Nakagawa | 385/78 |
| 2011/0243506 A1 | 10/2011 | Hsu | 385/76 |

* cited by examiner

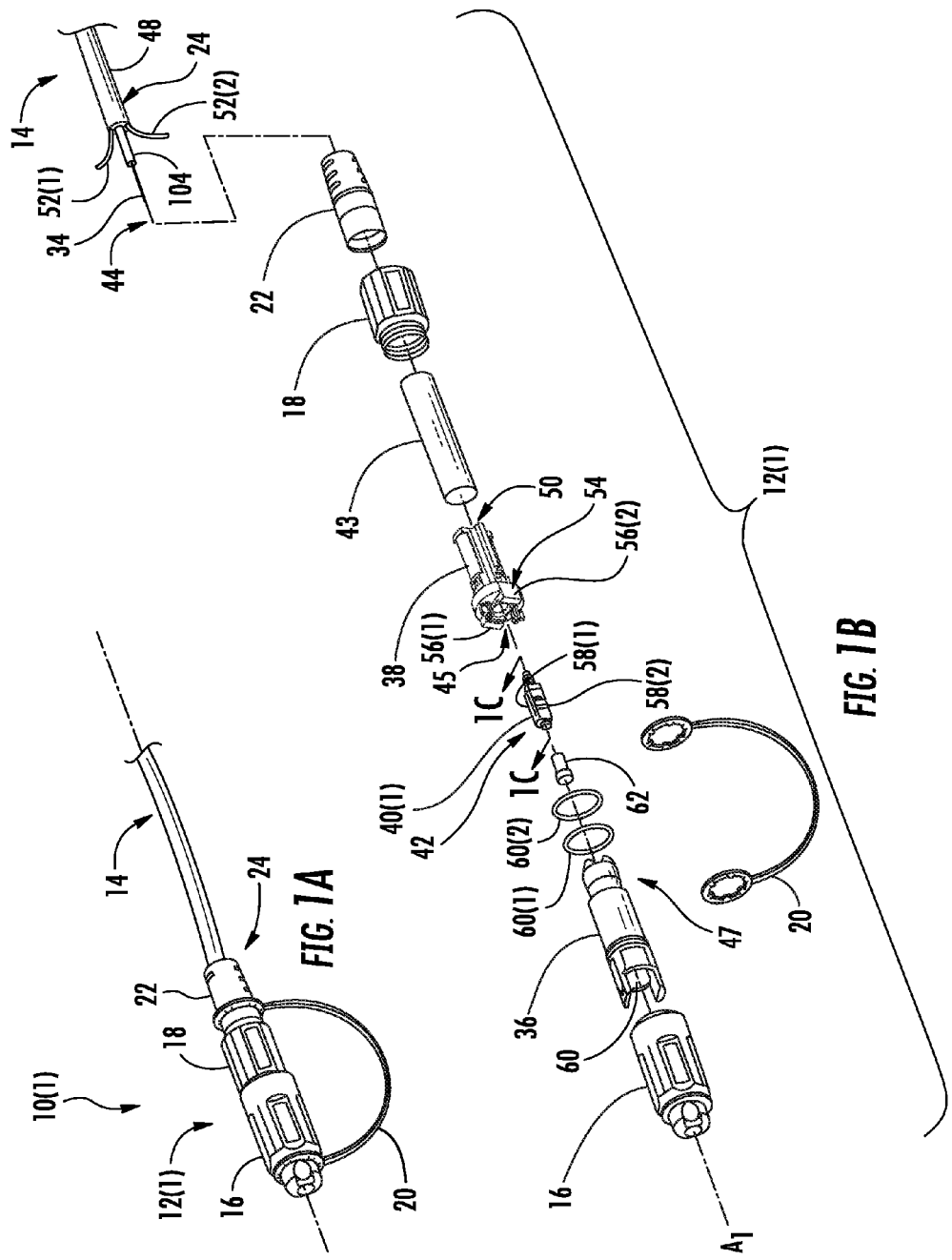

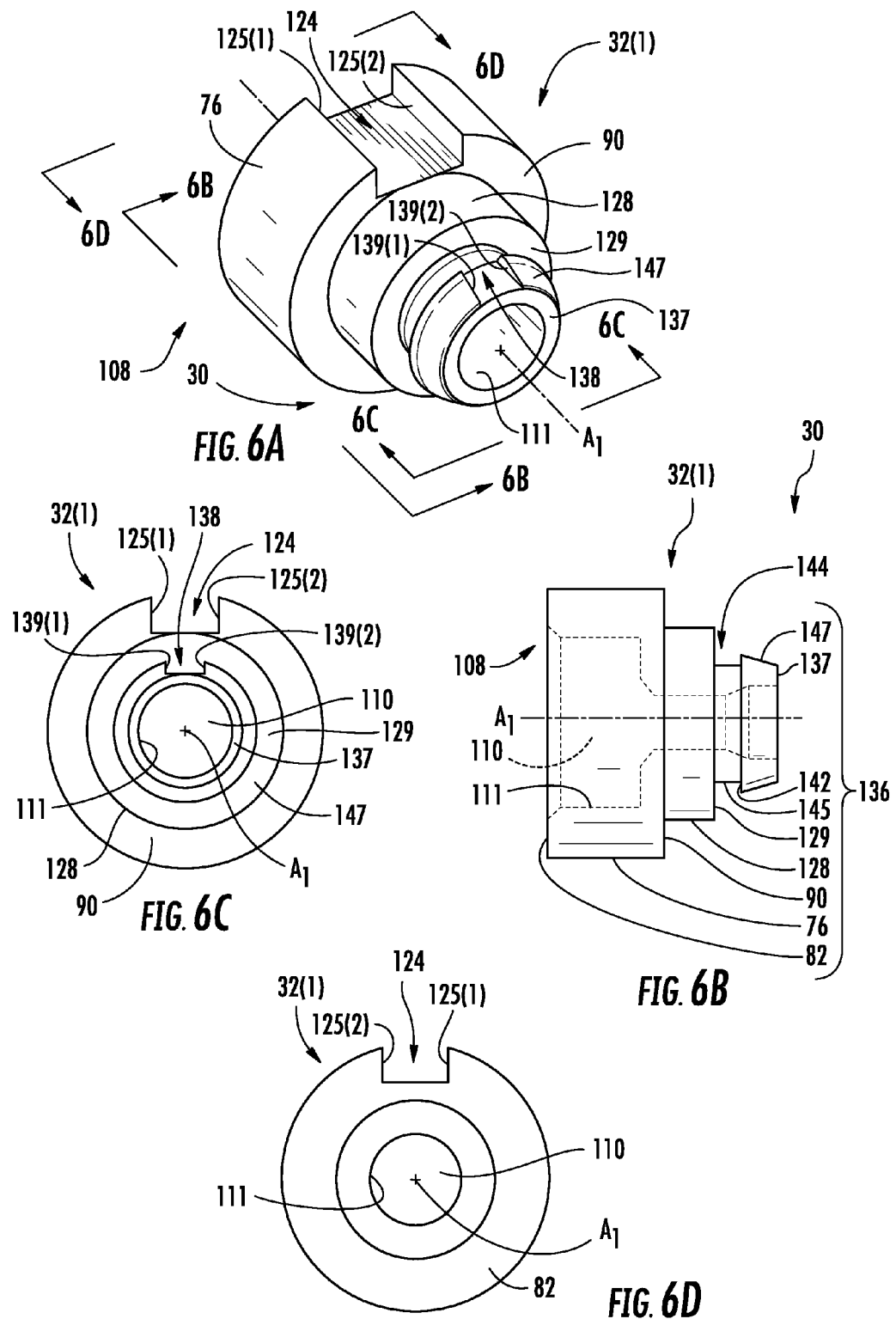

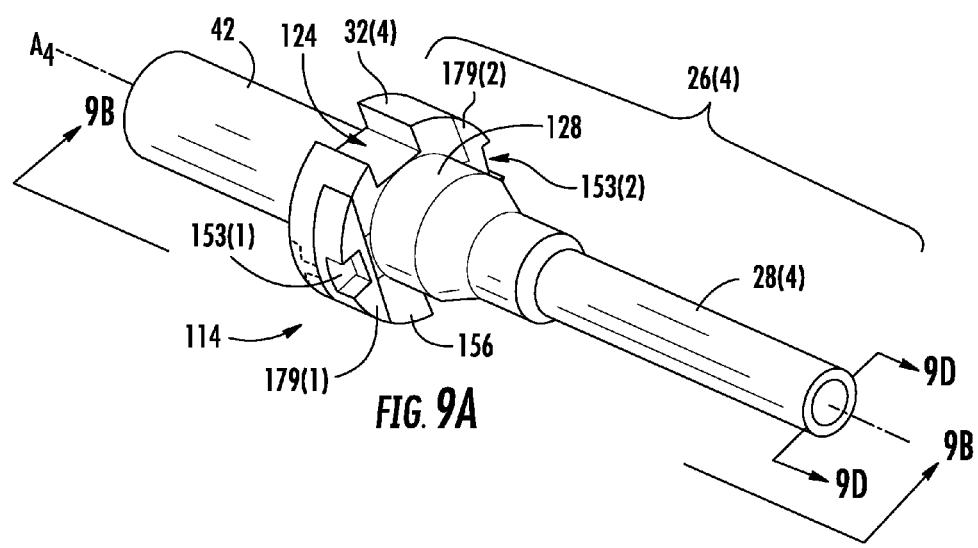
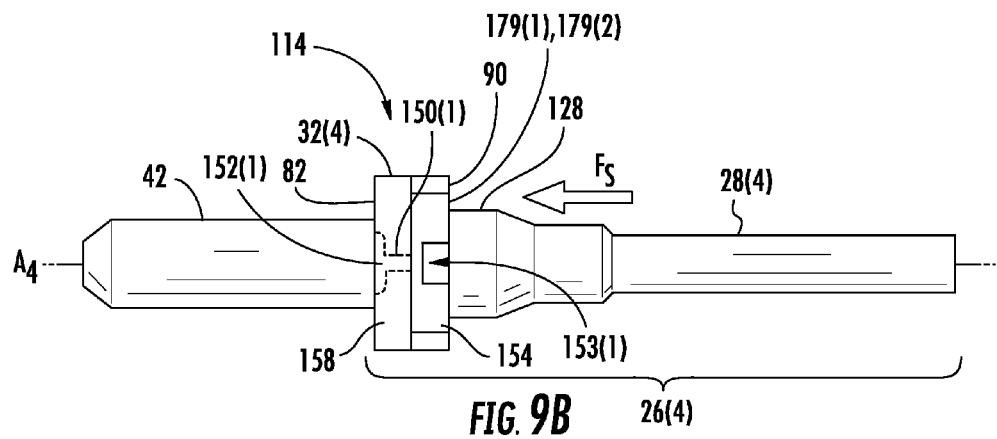

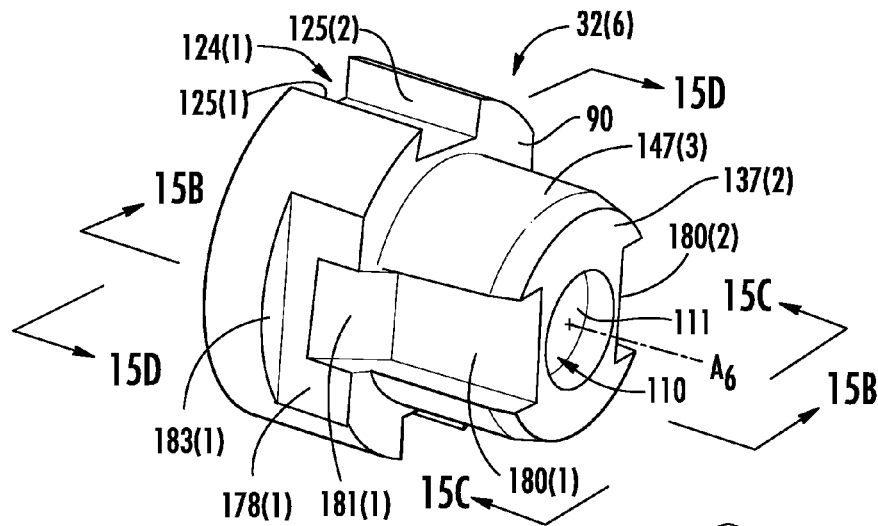
FIG. 15A
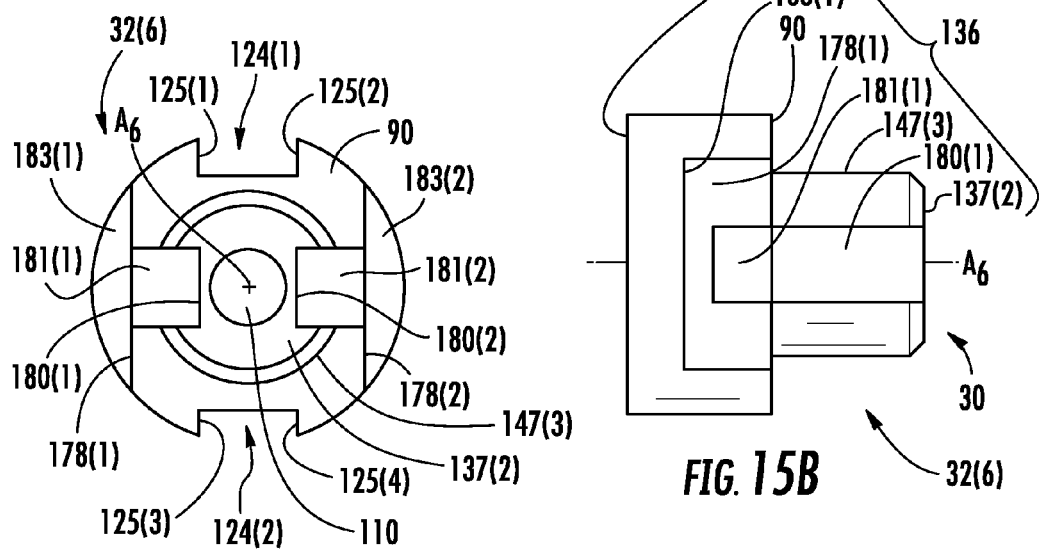
FIG. 15C
FIG. 15B
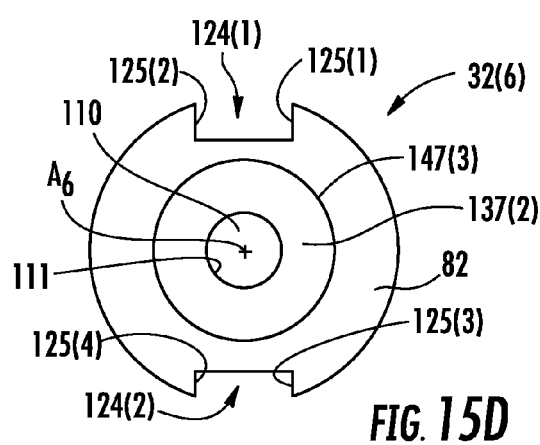
FIG. 15D

FERRULE HOLDERS WITH AN INTEGRAL LEAD-IN TUBE EMPLOYED IN FIBER OPTIC CONNECTOR ASSEMBLIES, AND RELATED COMPONENTS, CONNECTORS, AND METHODS

BACKGROUND

1. Field of the Disclosure

The technology of the disclosure relates to ferrule holders supporting ferrules in fiber optic connector assemblies for providing optic connectors for establishing fiber optic connections.

2. Technical Background

Optical fiber is increasingly being used for a variety of applications including but not limited to broadband voice video and data transmission. Benefits of optical fiber use include extremely wide bandwidth and low noise operation. With the increasing and varied use of optical fibers it is important to provide efficient methods of interconnecting optical fibers. Fiber optic connectors have been developed for this purpose. It is important that fiber optic connectors not significantly attenuate or alter the transmitted signal. In addition, the fiber optic connector should be relatively rugged and configured to be connected and disconnected a number of times in order to accommodate changes in the optical fiber transmission path. The fiber optic connector should also be configured for its environment. For example, outdoor interconnections may require a more rugged fiber optic connector that those designed for indoor interconnections. Because of the skill and equipment required for making optical fiber connections in the field, fiber optic cables are often pre-connectorized with fiber optic connectors for plug and play connectivity.

In this regard, a fiber optic connector typically employs a connector sub-assembly. The connector sub-assembly contains a ferrule holder that holds a ferrule. The ferrule holder has a passage extending therethrough that is axially aligned with a ferrule bore in the ferrule. An end portion of an optical fiber extending from a stripped fiber optic cable is inserted into the ferrule holder passage and into the ferrule bore. After assembly and polishing, the ferrule of the completed sub-assembly is suitable for optical alignment with the ferrule of a complementary connector assembly for establishing an optical connection between optical fibers disposed within the ferrules. More specifically, the optical fiber is held within the fiber optic connector sub-assembly. To firmly secure the optical fiber to the fiber optic connector sub-assembly, a bonding agent such as an epoxy is typically applied to the inside of a portion of the ferrule holder passage before the optical fiber is inserted therethrough. The optical fiber is then inserted into the ferrule holder passage through the bonding agent and into the ferrule bore.

A lead-in tube may be installed at the factory into a concentric inner surface located at a back end of the ferrule holder to facilitate optical fiber insertion. The lead-in tube generally has low flexural stiffness. There are benefits to the use of a lead-in tube. One benefit is that the lead-in tube generally restricts a bonding agent used during installation of an optical fiber into the ferrule to the ferrule holder passage and prevents the bonding agent from escaping. Otherwise, the bonding agent may come into contact with other areas of the fiber optic connector, such as a spring mechanism which must be free to move unfettered by the bonding agent. The lead-in tube also facilitates guiding an end portion of an optical fiber into the ferrule holder passage, where the optical fiber can then be guided to the ferrule. The lead-in tube may also prevent sharp bends from occurring in the optical fiber during insertion that could damage the optical fiber as the optical fiber is disposed in the ferrule holder passage and into the ferrule.

The lead-in tube may be difficult and expensive to manufacture and align to a ferrule holder body due to the tolerances required for use. The lead-in tube may also unexpectedly disengage from the ferrule holder because of friction with a syringe, which is temporarily inserted through the lead-in tube to inject the bonding agent before being removed. Lead-in tubes may also unexpectedly disengage from the ferrule holder because of vibration experienced during shipping. A lead-in tube which is less expensive to manufacture and more efficient to use to engage with a ferrule holder may be desired.

SUMMARY OF THE DETAILED DESCRIPTION

Embodiments disclosed herein include ferrule holders with an integral lead-in tube employed in fiber optic connector assemblies, and related components, connectors, and methods. By integrating the integral lead-in tube as part of the ferrule holder, the integral lead-in tube may be less expensive to manufacture and easier to install. The integral lead-in tube may also be less susceptible to inadvertent removal by friction with a bonding agent syringe or by vibration during shipment. The ferrule holder may include a ferrule holder body and integral lead-in tube. The integral lead-in tube may guide an optical fiber from a rear end of a fiber optic connector to an internal passage of the ferrule holder, where the optical fiber may be further guided to a ferrule for precise alignment with another optical device. The integral lead-in tube may also protect the optical fiber during installation, shipment, and use in the fiber optic connector.

Integrated as used herein means the integral lead-in tube is attached to the ferrule holder body according to a bond so that they do not detach from one another. The bond may be formed by a mechanical lock wherein material of the integral lead-in tube may encapsulate or flow into holes and other surface features in the more rigid structure of the ferrule holder body before solidifying. Alternatively, the bond may be derived from melt and/or chemical adhesion or cohesion between surfaces of the integral lead-in tube and the ferrule holder body. The bond may be formed, for example, through the addition of heat and/or utilization of overmold technology. In this manner, the integral lead-in tube may be integrated with the rear end of the ferrule holder body.

In this regard in one example, a ferrule holder for a fiber optic connector sub-assembly is provided. This fiber optic connector sub-assembly may include a ferrule holder body comprising a front end opposite a rear end along the optical axis. This ferrule holder body may also include an internal passage extending from the front end to the rear end along the optical axis. This fiber optic connector sub-assembly may also include an integral lead-in tube having a front end integrated with the rear end of the ferrule holder body. The lead-in tube may further include a lead-in bore extending in the optical axis from a rear end of the lead-in tube to the front end of the lead-in tube. The integral lead-in tube may be configured to receive and guide an end portion of an optical fiber along the optical axis through the rear end of the ferrule holder body and into the internal passage of the ferrule holder body.

In another example, a fiber optic connector sub-assembly employing a ferrule holder with an integral lead-in tube is provided. This fiber optic connector sub-assembly may include a housing with a front end and a rear end. The fiber optic connector sub-assembly may include the ferrule holder disposed within the housing. The ferrule holder may include a ferrule holder body comprising a front end opposite a rear end along the optical axis, with an internal passage extending from the front end to the rear end along the optical axis. The ferrule holder may include the integral lead-in tube having a front end integrated with the rear end of the ferrule holder body. The lead-in tube may further comprise a lead-in bore extending in the optical axis from a rear end of the lead-in tube to the front end of the lead-in tube. The rear end of the integral lead-in tube may be disposed through the rear of the housing. The fiber optic connector sub-assembly may further include a ferrule having a front end and a rear end. The rear end of the ferrule may be at least partially disposed within the internal passage at the front end of the ferrule holder body. The front end of the ferrule may be at least partially disposed within the front end of the housing. The integral lead-in tube may be configured to receive and guide an end portion of the optical fiber along the optical axis through the rear end of the ferrule holder body and into the internal passage of the ferrule holder body and into the rear end of the ferrule.

In another example, a method of creating a connectorized fiber optic cable is provided. The method may include providing a ferrule holder body. The ferrule holder body may include a front end opposite a rear end along the optical axis. The ferrule holder body may also include an internal passage therethrough extending along an optical axis from the rear end of the ferrule holder body to the front end of the ferrule holder body. The method may also include overmolding an integral lead-in tube upon the rear end of the ferrule holder body to form a ferrule holder with the integral lead-in tube which is integrated with the rear end of the ferrule holder body. The lead-in tube may include an inner lead-in surface forming a lead-in bore. The method may also include receiving a portion of a ferrule in the internal passage. The method may also include receiving the ferrule holder within an inner housing. The method may also include receiving an optical fiber through the lead-in tube, the ferrule holder body, and the ferrule.

In another example, a fiber optic connector is provided. The fiber optic connector may include a coupling nut configured to engage threads of a complementary fiber optic connector. The fiber optic connector may include a plug housing configured to receive an inner housing. The fiber optic connector may further include a pulling cap configured to protect fiber optic components from contaminants. The fiber optic connector may further include a fiber optic connector sub-assembly. The fiber optic connector sub-assembly may include the inner housing with a front end and a rear end. The fiber optic connector sub-assembly may also include a ferrule holder disposed within the inner housing. The ferrule holder may include a ferrule holder body comprising a front end opposite a rear end along the optical axis, with an internal passage extending from the front end to the rear end along the optical axis. The ferrule holder may further include an integral lead-in tube having a front end integrated with the rear end of the ferrule holder body. The lead-in tube further may comprise a lead-in bore extending in the optical axis from a rear end of the lead-in tube to the front end of the lead-in tube. The rear end of the integral lead-in tube may be disposed through the rear of the inner housing. The fiber optic connector sub-assembly may further include a ferrule having a front end and a rear end. The rear end of the ferrule may be at least partially disposed within the internal passage at the front end of the ferrule holder body. The front end of the ferrule may be at least partially disposed within the front end of the inner housing. The front end of the integral lead-in tube may be configured to receive and guide an end portion of an optical fiber along the optical axis through the rear end of the ferrule holder body and into the internal passage of the ferrule holder body and into the rear end of the ferrule.

In another example, a method of manufacturing a fiber optic connector sub-assembly as part of a fiber optic connector is provided. The method may include providing a ferrule holder body. The ferrule holder body may include a front end opposite a rear end along the optical axis. The ferrule holder body may also include an internal passage therethrough extending along an optical axis from the rear end of the ferrule holder body to the front end of the ferrule holder body. The method may also include overmolding an integral lead-in tube upon the rear end of the ferrule holder body to form a ferrule holder with the integral lead-in tube which is integrated with the rear end of the ferrule holder body. The lead-in tube may include an inner lead-in surface forming a lead-in bore. The method may also include receiving a portion of a ferrule in the internal passage. The method may also include receiving the ferrule holder within an inner housing.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIGS. 1A and 1B are a perspective view and an exploded perspective view, respectively, of an exemplary connectorized fiber optic cable including an exemplary fiber optic connector including a ferrule holder having an integrated lead-in tube provided as part of a fiber optic connector sub-assembly;

FIGS. 6A-6D are perspective, side, front, and back views, respectively, of a ferrule holder body in the fiber optic connector sub-assembly of FIG. 2;

FIGS. 9A-9D are perspective, side, perspective partial cross-sectional, and side cross-sectional views, respectively, of the ferrule holder of FIG. 8 employing an integral lead-in tube and supporting a ferrule;

FIGS. 15A-15D are perspective, side, back, and front views, respectively, of the ferrule holder body of FIG. 13A;

DETAILED DESCRIPTION

Figure 1C:
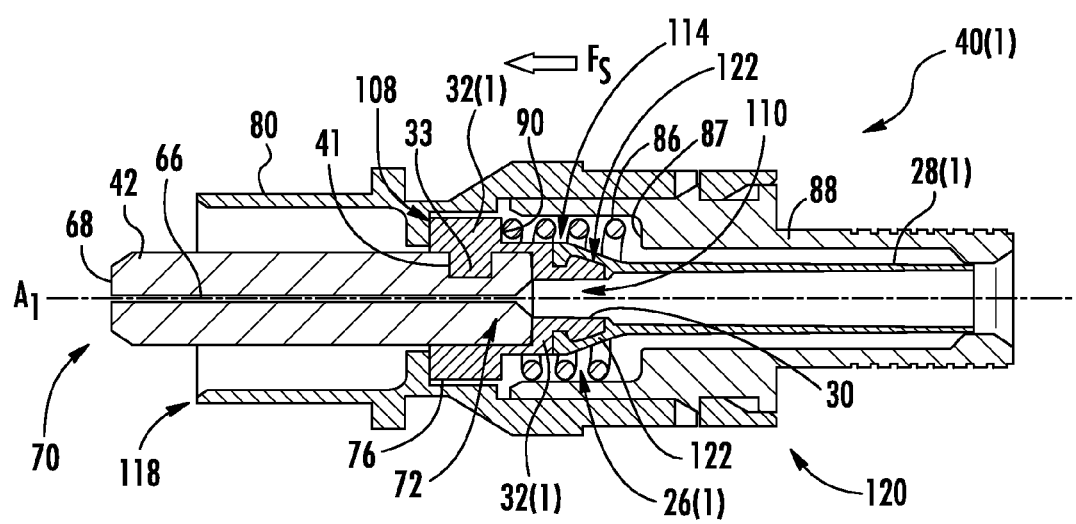
FIG. 1C is a side view of the fiber optic connector sub-assembly of the fiber optic connector of FIGS. 1A and 1B.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include ferrule holders with an integral lead-in tube employed in fiber optic connector assemblies, and related components, connectors, and methods. By integrating the integral lead-in tube as part of the ferrule holder, the integral lead-in tube may be less expensive to manufacture and easier to install. The integral lead-in tube may also be less susceptible to inadvertent removal by friction with a bonding agent syringe or by vibration during shipment. The ferrule holder may include a ferrule holder body and integral lead-in tube. The integral lead-in tube may guide an optical fiber from a rear end of a fiber optic connector to an internal passage of the ferrule holder, where the optical fiber may be further guided to a ferrule for precise alignment with another optical device. The integral lead-in tube may also protect the optical fiber during installation, shipment, and use in the fiber optic connector.

In this regard, to provide context before discussing specific aspects of the present disclosure relating to a fiber optic connector assemblies employing a ferrule holder, including an integral lead-in tube and related components, connectors, and methods, an exemplary connectorized fiber optic cable, including a fiber optic connector and fiber optic cable will first be described with respect to FIGS. 1A-1C.

In this regard, FIG. 1A is a perspective view of a fully-assembled example of a fiber optic connector 12(1) of a connectorized fiber optic cable 10(1) with a fiber optic cable 14. The fiber optic cable 14 extends to the fiber optic connector 12(1) where it may be optically coupled to a complementary fiber optic receptacle (not shown). The fiber optic connector 12(1) may include a pulling cap 16 fastened to a coupling nut 18 to protect fiber optic components (shown later in FIG. 1B) from contaminants which may increase signal attenuation and cause damage. The pulling cap 16 may be protected from being misplaced by a lanyard 20 which may be connected to a boot 22 of the fiber optic connector 12(1). The boot 22 may prevent a sharp bend from developing in a transition area 24 of the fiber optic cable 14 adjacent to the fiber optic connector 12(1).

FIG. 1B shows an exploded perspective view and a side cross-sectional view, respectively of the fiber optic connector 12(1) adjacent to the fiber optic cable 14. FIG. 1C shows a side cross-sectional view of a fiber optic connector sub-assembly 40(1) of the fiber optic connector 12(1). As will be discussed later (see FIG. 2), the fiber optic connector 12(1) includes a ferrule holder 26(1) with an integral lead-in tube 28(1). The integral lead-in tube 28(1) is integrated to a rear end 30 of a ferrule holder body 32(1) to provide lower cost and more efficient alignment of an optical fiber 34 of the fiber optic cable 14. The integral lead-in tube 28(1) generally restricts a location of a bonding agent used during installation of the optical fiber 34 and prevents the bonding agent from escaping. Otherwise, the bonding agent may come into contact with other areas of the fiber optic connector 12(1), such as a spring (discussed later) which must be free to move unfettered by the bonding agent. The integral lead-in tube 28(1) also facilitates guiding an end portion 44 of the optical fiber 34 into the ferrule holder body 32(1), where the optical fiber 34 can then be guided to a ferrule 42. The integral lead-in tube 28(1) may also prevent sharp bends from occurring in the optical fiber 34 during insertion that could damage the optical fiber 34 as the optical fiber 34 is disposed in the ferrule holder body 32(1) and into the ferrule 42. The fiber optic connector 12(1) may include a plug housing 36 in which a retention body 38 and a fiber optic connector sub-assembly 40(1) may be generally disposed during assembly.

As shown in FIG. 1C, the fiber optic connector sub-assembly 40(1) is introduced first because of its relationship to optically coupling the optical fiber 34 at an interconnection point. The fiber optic connector sub-assembly 40(1) may include the ferrule 42, which may be configured to laterally and angularly align the end portion 44 of the optical fiber 34 at the end face 46 of the ferrule 42 and may be routed through the ferrule 42. The end face 46 of the ferrule 42 is butted against a complementary receptacle (not shown), which may include for example another ferrule, under pressure to provide the lowest attenuation of light passing between the end portion 44 of the optical fiber 34 and the complementary receptacle. The ferrule 42 may be made of a rigid material that may be manufactured to tight tolerances, for example, a ceramic material.

It is noted that the ferrule 42 may include a ferrule notch 41. The ferrule notch 41 may be filled with a portion 33 of the ferrule holder body 32(1) to prevent the ferrule 42 from disengaging from the ferrule holder body 32(1). The ferrule holder body 32(1) may comprise, for example, molded plastic.

With reference back to FIG. 1B, the plug housing 36 is described next. The plug housing 36 may contain the fiber optic connector sub-assembly 40(1). A heat shrink 43 may be disposed about an end portion 47 of the plug housing 36 and the end portion 44 of the fiber optic cable 14. The heat shrink 43 may be used to provide a flexible environmental seal between the end portion 47 of the plug housing 36 and the fiber optic cable 14 to prevent contaminants from entering the fiber optic connector 12(1).

As to the fiber optic cable 14, it may be a single fiber drop cable and the ferrule 42 may be a single fiber ferrule, although the use of other types of drop cables, optical fibers connector types, and/or ferrules are possible. The fiber optic connector 12(1) may also include the coupling nut 18 that may be externally threaded for engaging threads of a complementary connector, receptacle, bulkhead, or the like (not shown), thereby aligning and optically mating the ferrule 42 of fiber optic connector 12(1) and the complementary receptacle (not shown).

Next, the retention body 38 may also be disposed within the plug housing 36. The retention body 38 may facilitate optical coupling of the optical fiber 34 of the fiber optic cable 14 to the fiber optic connector sub-assembly 40(1) having the ferrule 42. The optical fiber 34 of fiber optic cable 14 may be surrounded by an outer jacket 48. A rear portion 50 of retention body 38 may engage and may retain one or more strength members 52(1), 52(2) provided inside the fiber optic cable 14 for strain relief. A front portion 54 of retention body 38 may engage and may retain the fiber optic connector sub-assembly 40(1). In this manner, the retention body may provide strain relief to the optical fiber 34 of the fiber optic connector sub-assembly 40(1).

The retention body 38 may include a central bore 45 extending therethrough that receives the optical fiber 34 for insertion into the fiber optic connector sub-assembly 40(1) and into the ferrule 42. In the embodiment of FIG. 1B, the retention body 38 may be secured to the fiber optic connector sub-assembly 40(1) via a pair of snap hooks 56(1), 56(2). These snap hooks 56(1), 56(2) may be configured to engage snap hook recesses 58(1), 58(2) disposed on opposing sides of the fiber optic connector sub-assembly 40(1), but another structure may be used for engagement. Once the plug housing 36 is secured over the retention body 38 and snap hooks 56(1), 56(2) engage fiber optic connector sub-assembly 40(1), then an interior surface 59 of plug housing 36 may contact the snap hooks 56(1), 56(2) to maintain snap hooks 56(1), 56(2) within snap hook recesses 58(1), 58(2).

With continuing reference to FIG. 1B, the fiber optic connector 12(1) may also include one or more silicone O-rings 60(1), 60(2) which environmentally seal the fiber optic connector 12(1) and the complementary receptacle when joined and the boot 22. The boot 22, as discussed briefly above, further relieves stress in the fiber optic cable 14. The fiber optic connector 12(1) may incorporate a second dust cap 62 which may be removably attached and protects the ferrule 42. In this way, the ferrule 42 may remain free from contaminants.

Figure 2:
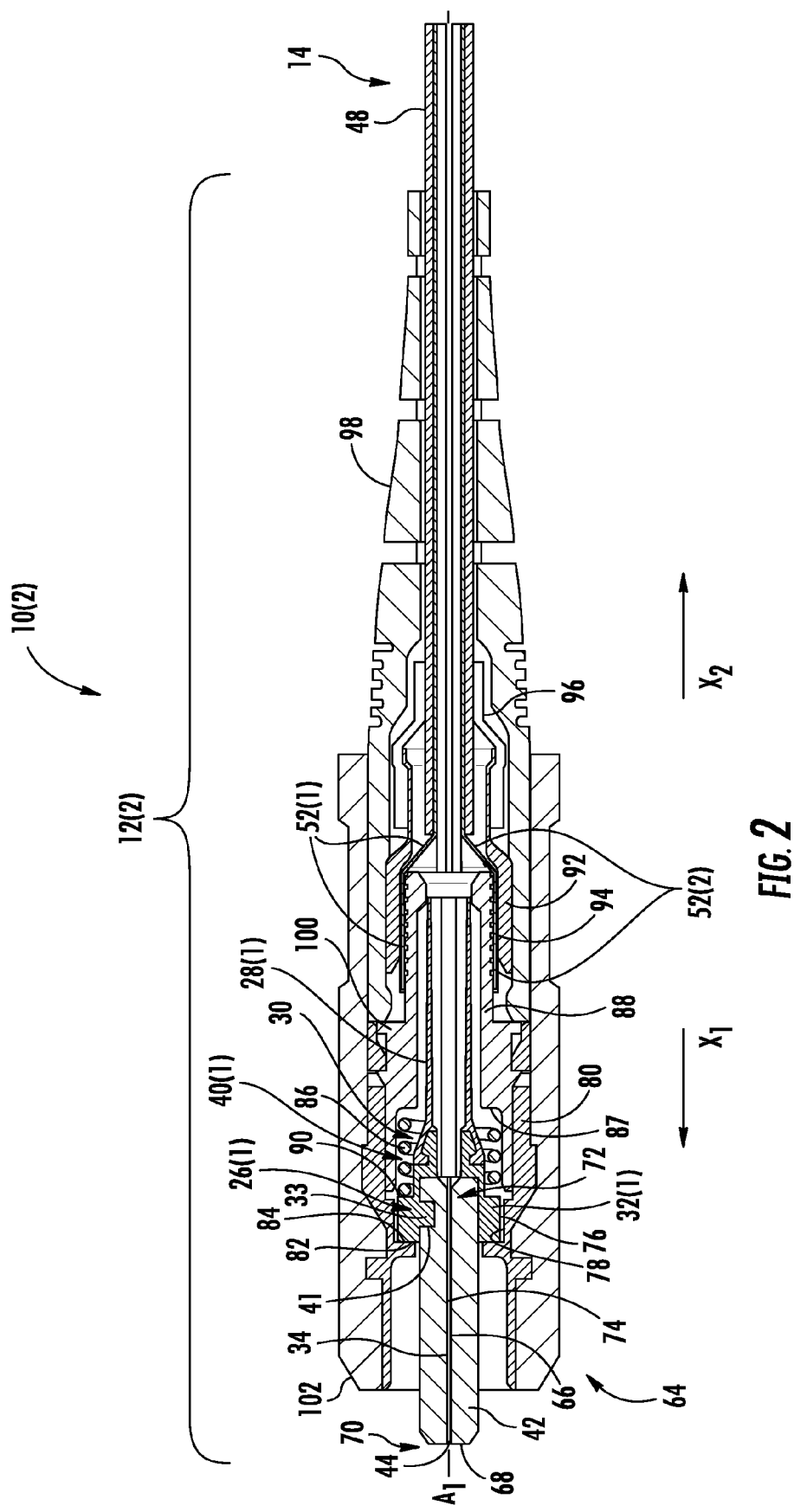
FIG. 2 is a side cross-sectional view of another embodiment of a fiber optic connector including the ferrule holder having the integrated lead-in tube provided as part of the fiber optic connector sub-assembly of FIGS. 1A and 1B.

To illustrate the internal components of the fiber optic connector 12(1) that include an example of a ferrule holder 26(1) having an integral lead-in tube 28(1), FIG. 2 is provided. FIG. 2 shows a side cross-sectional view of another embodiment of a fiber optic connector 12(2), including the fiber optic connector sub-assembly 40(1) of the fiber optic connector 12(1). The fiber optic connector 12(2) may comprise the ferrule holder 26 including the ferrule holder body 32(1) and the integral lead-in tube 28(1), which may be integrated with the rear end 30 of the ferrule holder body 32(1).

With continuing reference to FIG. 2, the ferrule 42 may be disposed at a front end 64 of the fiber optic connector sub-assembly 40(1). The ferrule 42 may include a ferrule bore 66 in which the optical fiber 34 may be received so that the end portion 44 of the optical fiber 34 may be located at the end face 68 for convenient optical coupling with the complementary receptacle.

The ferrule 42 may include a front end 70 and a rear end 72 opposite the front end 70 along an optical axis $A_1$. The optical axis $A_1$ coincides with the ferrule bore 66, because the optical fiber 34 may be received through the ferrule bore 66. The optical fiber 34 may be secured within the ferrule bore 66 with a bonding agent 74. The bonding agent 74 may prevent movement of the optical fiber 34 within the ferrule bore 66 to minimize signal attenuation between the optical fiber 34 and the complementary receptacle (not shown) which may include an opposing optical fiber. Movement of the optical fiber 34 within the ferrule bore 66 may be undesirable because the movement may cause attenuation.

The ferrule 42 may be at least partially disposed within the ferrule holder body 32(1) of a ferrule holder 26(1). The ferrule holder body 32(1) may include a body alignment surface 76 which may be disposed to allow easy insertion of the ferrule holder body 32(1) within a housing of the fiber optic connector sub-assembly 40(1). In the examples used herein, the housing may be, for example, an inner housing 80 including a housing alignment surface 78. It is noted that the ferrule holder 26(1) may also be used in other fiber optic connectors including a spring-loaded ferrule holder without the inner housing 80, for example, non-SC type fiber optic connectors. In these other fiber optic connectors, the housing may be an enclosure (not shown) around the ferrule holder 26(1).

With continuing reference to FIG. 2, the body alignment surface 76 and the housing alignment surface 78 may be parallel to the optical axis $A_1$. In this regard, the housing alignment surface 78 may align the ferrule holder body 32 within the inner housing 80 and allow translation of the ferrule holder body 32 along the optical axis $A_1$. The translation of the ferrule holder body 32(1) within the inner housing 80 may be purposefully limited. The ferrule holder body 32(1) may include an abutment surface 82 which may abut against a complementary stopping surface 84 of the inner housing 80. The complementary stopping surface 84 may prevent translation of the ferrule holder body 32(1) in a forward direction $X_1$ with respect to the inner housing 80.

A spring 86 may be disposed between a spring seat base 87 of the crimp body 88 attached to the inner housing 80 and a spring seating surface 90 of the ferrule holder body 32(1). The bonding agent 74, for example epoxy, which may be used during the installation of the optical fiber 34, should not come into contact with the spring 86 or the bonding agent 74 may obstruct its movement. The integral lead-in tube 28(1) may generally restrict the bonding agent 74 to an area within the ferrule holder 26(1), and may prevent the bonding agent 74 from reaching the spring 86.

The spring 86 may be biased to apply a spring force $F_S$ (see FIG. 1C) to the spring seating surface 90 to push the ferrule holder body 32(1) against the complementary stopping surface 84 when the end face 68 of the ferrule 42 is not in contact with the complementary receptacle. With contact between the end face 68 and the complementary receptacle, the ferrule holder body 32(1) may translate in the rear direction $X_2$ and the force $F_S$ will press the end face 68, including the end portion 44 of the optical fiber 34, against the complementary receptacle to minimize attenuation.

The crimp body 88 may extend in the rear direction $X_2$ from the inner housing 80. A crimp band 92 may be crimped to a rear end 94 of the crimp body 88 to anchor the strength members 52(1), 52(2) between the crimp band 92. A heat shrink 96 may be shrunk over the outer jacket 48 of the fiber optic cable 14 and the crimp body 88 to thereby retain the outer jacket 48 within the fiber optic connector 12(1). A boot 98 may be fit over the crimp band 92 and extend in the rear direction $X_2$ to thereby provide minimum bend radius protection to the fiber optic cable 14.

With continued reference to FIG. 2, the inner housing 80 is disposed within a plug housing 102. The plug housing 102 may protect the inner housing 80.

Figure 3:
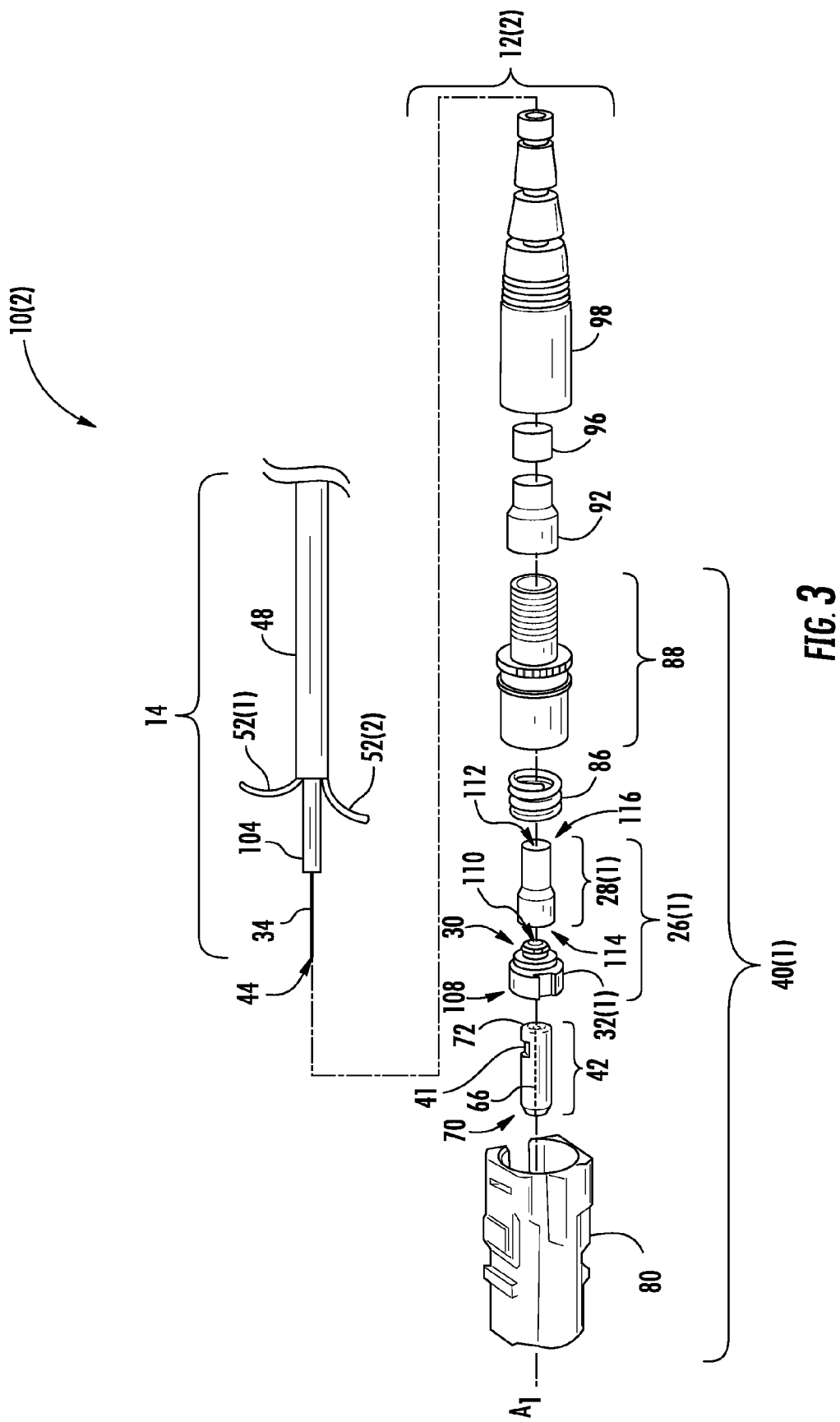
FIG. 3 is an exploded perspective view of the fiber optic connector subassembly of FIG. 1B disposed adjacent to the fiber optic cable stripped back to expose an end portion of the optical fiber to be inserted into the integral lead-in tube.

FIG. 3 shows the fiber optic connector 12(2) in an exploded perspective view, but without the plug housing 102 to focus on components closest to the optical fiber 34. The fiber optic cable 14 may comprise the outer jacket 48, the strength members 52(1), 52(2), a buffered portion 104, optical fiber 34, and the end portion 44 of the optical fiber 34. The end portion 44 may be disposed at the end face 46 of the ferrule 42 once the fiber optic connector 12(2) is fully assembled and connected to the optical fiber 34. The fiber optic connector 12(2) may include the boot 98, the crimp band 92, the crimp body 88, the spring 86, the ferrule holder 26(1), the ferrule 42, and the inner housing 80. The optical fiber 34 may pass through these components during the process to align the optical fiber at the ferrule 42.

Now that the details of an exemplary fiber optic connector 12(2) have been discussed employing the ferrule holder 26(1) having the integral lead-in tube 28(1) with regard to FIGS. 1A through 3, the relationship of the ferrule holder 26(1) having the integral lead-in tube 28(1) to the insertion of the optical fiber 34 into the ferrule 42 and ferrule holder 26(1) will now be discussed in relation to a fiber optic connector sub-assembly 40(1). The fiber optic connector sub-assembly 40(1) may form the final critical passageway travelled by the end portion 44 of the optical fiber 34 to the end face 68. The fiber optic connector sub-assembly 40(1) may include the inner housing 80, the ferrule 42, the ferrule holder 26(1), the spring 86, and the crimp body 88. The ferrule holder 26(1) includes the ferrule holder body 32(1) and the integral lead-in tube 28(1) which may be integrated with the rear end 30 of the ferrule holder body 32(1). The ferrule holder body 32(1) may comprise a front end 108 opposite the rear end 30 along the optical axis $A_1$. The ferrule holder body 32(1) may include an internal passage 110 formed by an inner body surface 111 (FIGS. 6A-6D) extending from the front end 108 to the rear end 30 along the optical axis $A_1$ to thereby align the end portion 44 of the optical fiber 34 to the ferrule bore 66. The integral lead-in tube 28(1) may include a front end 114 integrated with the rear end 30 of the ferrule holder body 32(1). The integral lead-in tube 28(1) may include a lead-in bore 112 extending in the optical axis $A_1$ from the rear end 116 of the integral lead-in tube 28(1) to the front end 114 of the integral lead-in tube 28(1). The front end 114 of the integral lead-in tube 28(1) may be configured to receive and guide the end portion 44 of the optical fiber along the optical axis $A_1$ through the rear end 30 of the ferrule holder body 32(1) and into the internal passage 110 of the ferrule holder body 32(1). As previously discussed, the integral lead-in tube 28(1) may be less expensive to manufacture and easier to be disposed in the ferrule holder body 32(1).

Figure 4A:
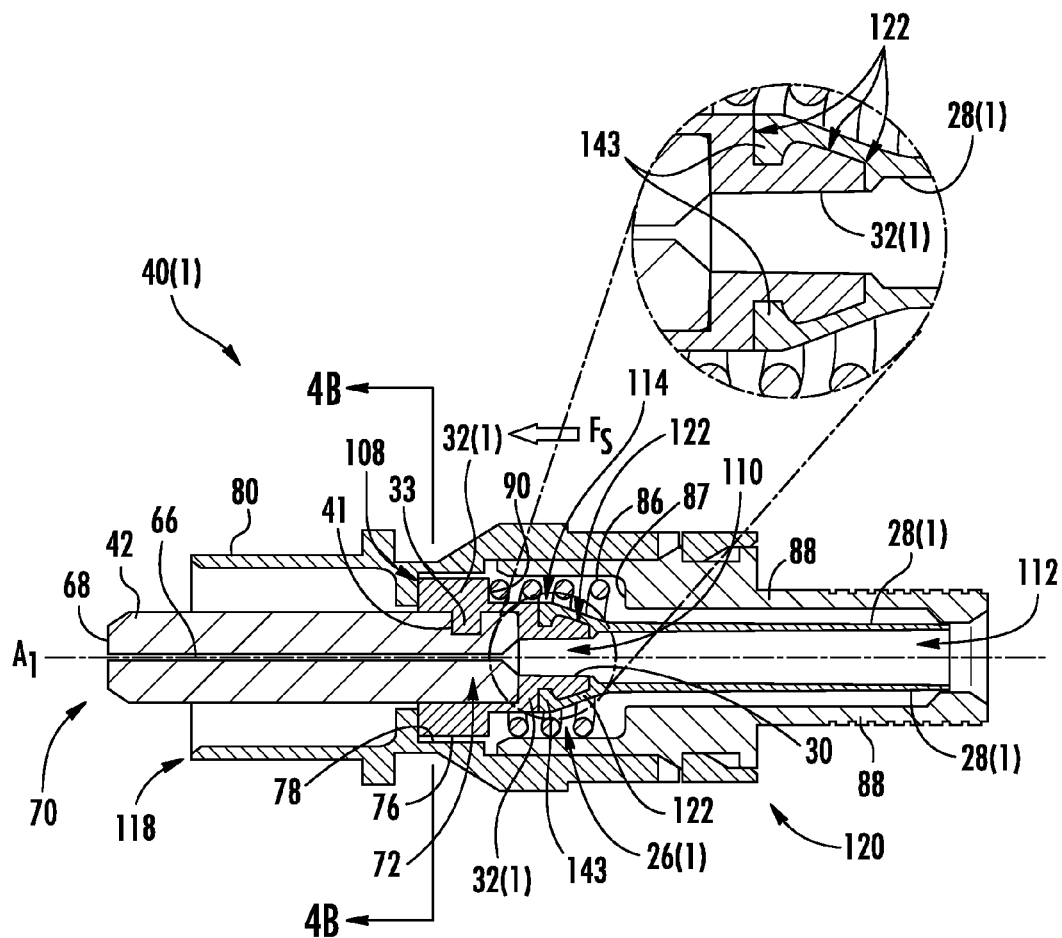
FIG. 4A is a side cross-sectional view of the fiber optic connector sub-assembly of FIG. 2.

FIG. 4A is a side cross-sectional view of the fiber optic connector sub-assembly 40(1). The inner housing 80 may include a front end 118 and a rear end 120. The ferrule holder 26(1) may be disposed within the inner housing 80(1). In this regard, the inner housing 80 may act to align the ferrule holder 26(1) and allow translation along the optical axis $A_1$ and/or may isolate the ferrule 42 from random perturbation forces ("side or straight loads") parallel or angled to the optical axis $A_1$. The rear end 72 of the ferrule 42 may be at least partially disposed within the internal passage 110 at the front end 108 of the ferrule holder body 32(1). The front end 70 of the ferrule 42 may be at least partially disposed within the front end 118 of the inner housing 80. In this regard, the ferrule 42 may be better protected from random perturbation forces ("side loads") orthogonal to the optical axis $A_1$ when unmated to the complementary receptacle (not shown).

With continuing reference to FIG. 4A, the front end 114 of the integral lead-in tube 28(1) may be configured to receive and guide the end portion 44 (see FIG. 3) of the optical fiber 34 along the optical axis $A_1$ through the rear end 30 of the ferrule holder body 32(1) and into the internal passage 110 of the ferrule holder body 32(1) and into the rear end 72 of the ferrule 42. This enables the end portion 44 of the optical fiber 34 to reach the rear end 72 of the ferrule 42 with a protected and aligned position before continuing through the ferrule bore 66 to the end face 68.

The integral lead-in tube 28(1) may include a front end 114 integrated with the rear end 30 of the ferrule holder body 32(1) according to a bond 122. Integrated as used herein means the integral lead-in tube 28(1) and the ferrule holder body 32(1) are joined with the bond 122 so that the integral lead-in tube 28(1) and the ferrule holder body 32(1) do not detach from each other. The bond 122 may be formed by a mechanical lock wherein material of the integral lead-in tube 28(1) may encapsulate or flow into holes and other surface features of the ferrule holder body 32(1) before solidifying. Alternatively, the bond 122 may be derived from melt and/or chemical adhesion or cohesion between surfaces of the integral lead-in tube 28(1) and the ferrule holder body 32(1). One way to achieve the bond 122 may be through the addition of heat and/or overmold technology. In this manner, the integral lead-in tube 28(1) may be integrated with the rear end 30 of the ferrule holder body 32(1).

The integral lead-in tube 28(1) may be made of a relatively inexpensive, very flexible and resilient material with high surface lubricity, for example, polyethylene, silicone, or thermoplastic elastomer. This material may also include additives, for example, mineral fill or silica-based lubricant or graphite. In this manner, the optical fiber 34 may smoothly travel the lead-in bore 112 without being caught during insertion. The material may be of a type of material that would not be degraded by epoxy or any other chemical agent in standardized testing (reference Telcordia GR-326-CORE) and would not allow bonding by epoxy, a common example of the bonding agent 74.

As to the ferrule holder body 32(1), it may be made of a relatively strong material, for example, metal or plastic. The ferrule holder body 32 may be made with all junctions and edges chamfered or otherwise smoothly transitioned from one inside diameter to the next to provide surfaces to the optical fiber 34 without sharp edges for the optical fiber 34 to catch during insertion.

With continuing reference to FIG. 4A, the ferrule holder 26(1) may include the spring seating surface 90 receiving the spring force $F_S$ from the spring 86. The spring force $F_S$ may be directed towards the front end 108 of the ferrule holder body 32(1). This enables the ferrule holder 26(1) to push the ferrule 42 towards the complementary receptacle (not shown) when they are exerting pressure on one another along the optical axis $A_1$.

Figure 4B:
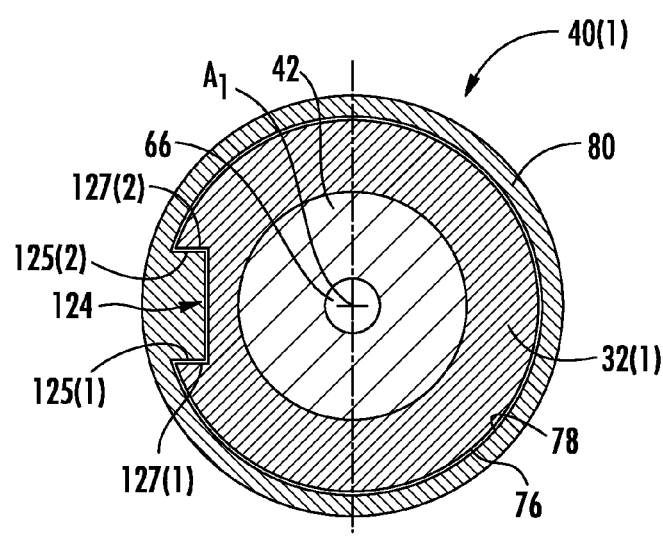
FIG. 4B is a full cross-sectional view parallel to an optical axis of the fiber optic connector sub-assembly of FIG. 4A.

FIG. 4B is a full cross-sectional view parallel to the optical axis $A_1$ of the fiber optic connector sub-assembly 40(1) of FIG. 4A. The ferrule holder body 32(1) may be disposed within the inner housing 80 in such a manner that the body alignment surface 76 of the ferrule holder body 32(1) may abut against the housing alignment surface 78 of the inner housing 80 to align the ferrule 42 within the inner housing 80. It is also noted that the fiber optic connector sub-assembly 40(1) may alternatively include a clearance fit where the body alignment surface 76 and the housing alignment surface 78 do not abut against each other.

The ferrule holder body 32(1) may also include at least one alignment notch 124 in the ferrule holder body 32(1) to prevent the ferrule holder body 32(1) from moving angularly with respect to the inner housing 80. Anti-rotation surfaces 125(1), 125(2) of the alignment notch 124 may prevent angular movement of the ferrule holder body 32(1) by abutting against angular stopping surfaces 127(1), 127(2) of the inner housing 80. Preventing angular movement of the ferrule holder body 32(1) and the ferrule 42 connected to the ferrule holder body 32(1) may be beneficial, for example, when polishing the end face 68 of the ferrule 42 and aligning the ferrule 42 to the complementary fiber optic receptacle, which may include an angled physical contact (APC) ferrule (not shown).

Figure 5A:
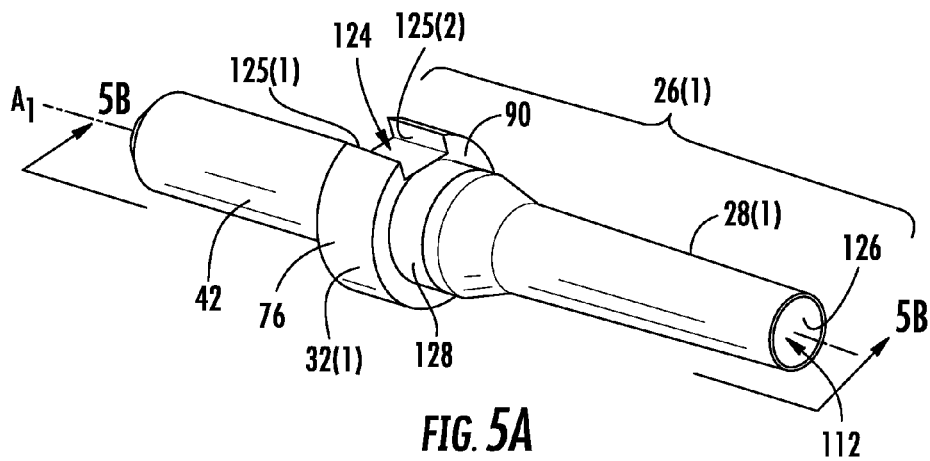
FIGS. 5A-5D are perspective, side, exploded perspective, and partial cross-sectional views, respectively, of the fiber optic connector sub-assembly of FIG. 2.

FIGS. 5A-5D are perspective, side, exploded perspective and perspective cross-sectional views, respectively, of the ferrule holder 26(1) with the ferrule 42 in FIG. 4A. FIG. 5A depicts an alignment notch 124 in the ferrule holder body 32(1) to prevent the ferrule holder body 32(1) from moving angularly with respect to the inner housing 80. It is noted that the ferrule holder body 32(1) may include more than one alignment notch 124. Accordingly, the ferrule holder body 32(1) may be restricted to the translation parallel to the optical axis $A_1$.

Figure 5B:
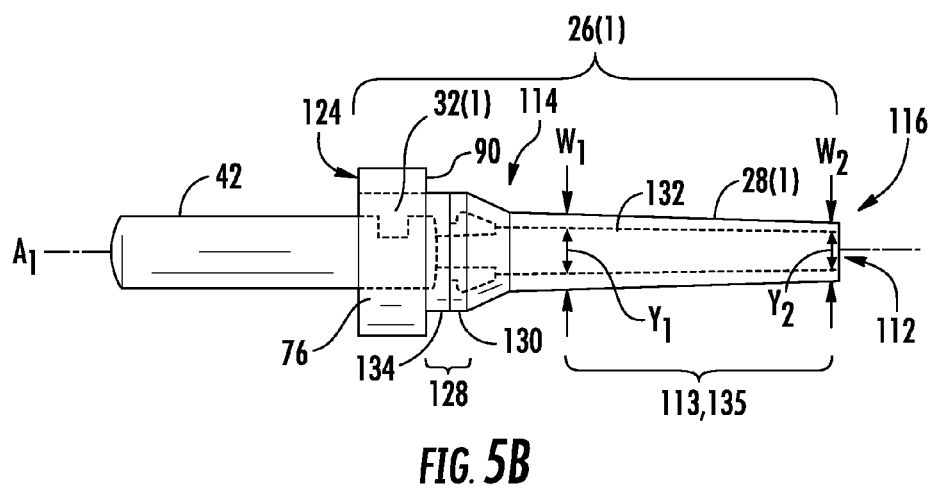

An inner lead-in surface 126 may form the lead-in bore 112 of the integral lead-in tube 28(1). The inner lead-in surface 126 may guide the optical fiber 34 thorough the lead-in bore 112 and into the internal passage 110 of the ferrule holder body 32(1). The inner lead-in surface 126 may include a tapered portion 113 along the optical axis $A_1$ to include a larger maximum width $Y_1$ of the lead-in bore 112 near the front end 114 of the integral lead-in tube 28(1) to $Y_2$ near the rear end 116. The tapered portion 113 may improve molding performance during manufacturing and reduce the likelihood of the inner lead-in surface 126 catching the optical fiber 34. FIG. 5B shows the ferrule holder 26(1) which may include a spring alignment surface 128 configured to align the spring 86 along the optical axis $A_1$. The spring alignment surface 128 may comprise at least a portion 130 of an outer lead-in surface 132 of the integral lead-in tube 28(1). The spring alignment surface 128 may also comprise at least a portion 134 of an outer surface 136 of the ferrule holder body 32(1).

FIG. 5B also shows the outer lead-in surface 132 of the integral lead-in tube 28(1) which may include a tapered portion 135. A width $W_1$ of the outer lead-in surface 132 adjacent to the rear end 30 of the ferrule holder body 32(1) may be greater than a width $W_2$ of the outer lead-in surface 132 adjacent to the rear end 116 of the integral lead-in tube 28(1). The tapered portion 135 may extend along the optical axis $A_1$ from the width $W_1$ to the width $W_2$. This tapered portion 135 may allow for more efficient manufacturing, for example, better flow characteristics during molding of the integral lead-in tube 28(1).

Figure 5C:
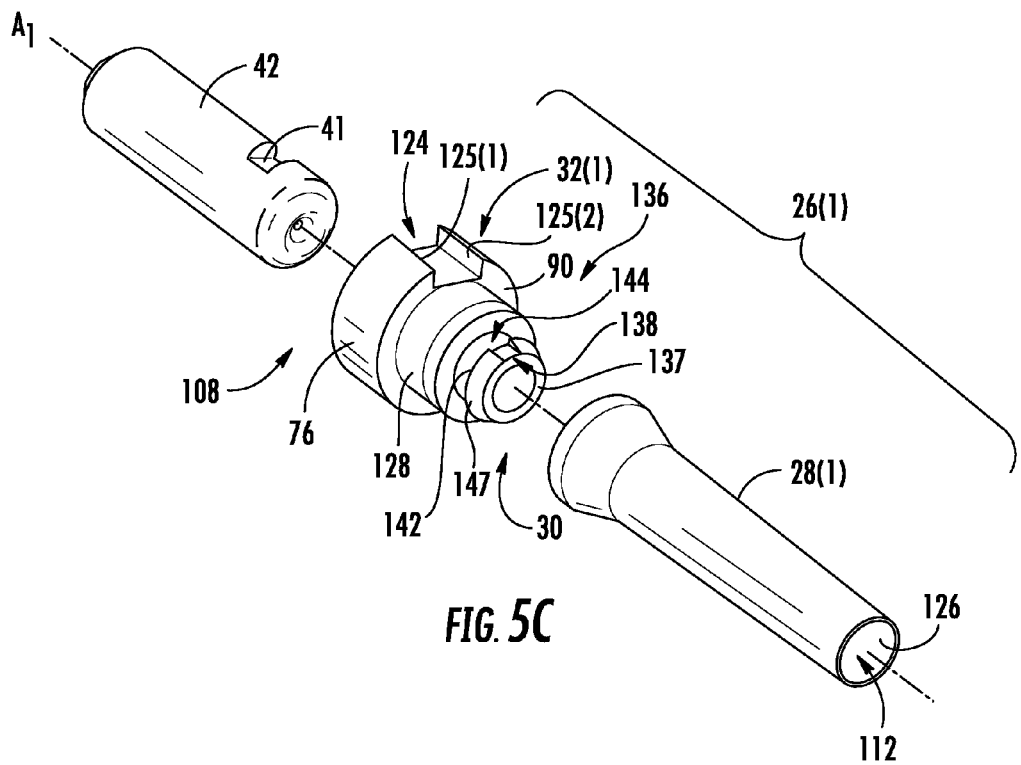
Figure 5D:
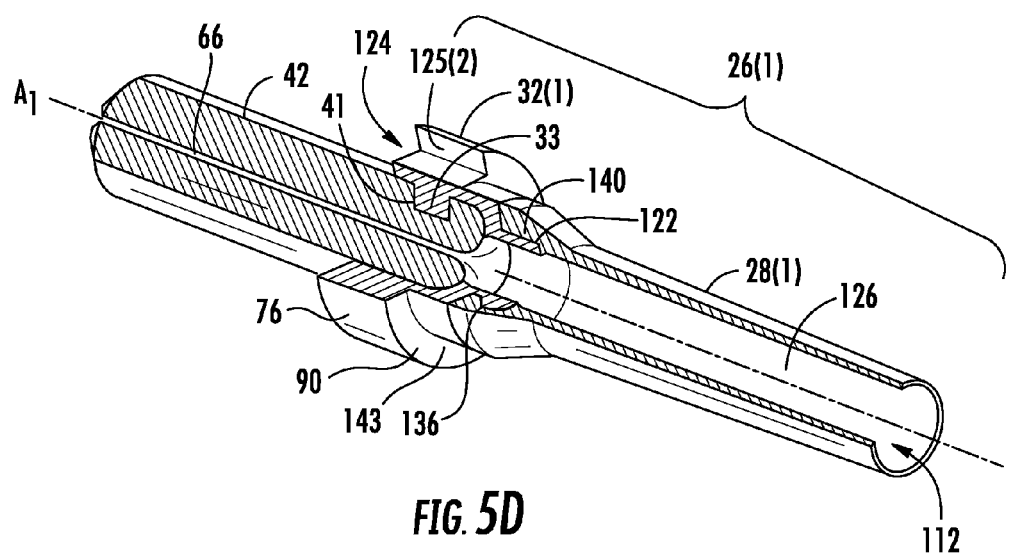

FIG. 5C shows the ferrule 42 and the integral lead-in tube 28(1) separated from the ferrule holder body 32(1) to provide a close-up of the relationships therebetween. The rear end 30 of the ferrule holder body 32(1) may include an outer surface 136. The inner lead-in surface 126 of the integral lead-in tube 28(1) may at least partially encapsulate the outer surface 136 as shown in FIG. 5D. In this manner, at least partially encapsulate means the bond 122 (FIG. 4A) may be formed between the inner lead-in surface 126 and the outer surface 136 so as to prevent the integral lead-in tube 28(1) and the ferrule holder body 32(1) from detaching.

With continuing reference to FIG. 5C, the outer surface 136 of the ferrule holder body 32(1) may include a lead-in notch 138 configured to prevent rotation of the integral lead-in tube 28(1) relative to the ferrule holder body 32(1). At least a portion 140 of the inner lead-in surface 126 (FIG. 5D) may be disposed within the lead-in notch 138. In this manner, the integral lead-in tube 28(1) may be less likely to angularly detach from the ferrule holder body 32(1).

FIGS. 6A-6D show perspective, side, front, and back views of the ferrule holder body 32(1), respectively. The ferrule holder body 32(1) was shown earlier in the fiber optic connector sub-assembly 40(1) of FIG. 4A and the ferrule holder 26(1) of FIGS. 5A-5D. The outer surface 136 of the ferrule holder body 32 may include a first lock surface 142 of a recess 144 configured to integrate the integral lead-in tube 28(1) relative to the ferrule holder body 32(1). In this manner, the integral lead-in tube 28(1) may be less likely to detach from the ferrule holder body 32(1) when subjected to a random perturbation force parallel to the optical axis $A_1$. FIG. 6B also depicts that the internal passage 110 may not be of uniform dimensions from the rear end 30 to the front end 108 of the ferrule holder body 32(1) as formed by the inner body surface 111. Larger dimensions of the internal passage 110 at the front end 108 of the ferrule holder body 32(1) with respect to the rear end 30 may be required to receive the rear end 72 (FIG. 4A) of the ferrule 42.

Details of other features of the ferrule holder body 32(1) are also depicted in FIGS. 6A-6D, including the alignment notch 124. The alignment notch 124 may include anti-rotation surfaces 125(1), 125(2) to prevent rotation of the ferrule holder body 32(1) with respect to the inner housing 80. The anti-rotation surfaces 125(1), 125(2) may abut complementary surfaces of the inner housing 80 which are designed to be static and thereby oppose rotation of the ferrule holder body 32(1) in clockwise and counter-clockwise directions respectively. In this manner, the ferrule 42 containing the optical fiber 34 may be prevented from rotation and thereby attenuation may be minimized. The anti-rotation surfaces 125(1), 125(2) may be parallel to the optical axis $A_1$ to improve manufacturing efficiency and to allow translation parallel to the optical axis $A_1$. The alignment notch 124 may be disposed adjacent to the body alignment surface 76 to enable the greater stability of the ferrule holder body 32(1) within the inner housing 80.

The ferrule holder body 32(1) may also include a lead-in notch 138 of the outer surface 136 configured to be integrated to the integral lead-in tube 28(1). The integration may occur with a bond 122 (FIG. 4A) so that they do not detach from one another. The lead-in notch 138 may include anti-twist surfaces 139(1), 139(2) which may be encapsulated or filled with the portion 140 (FIG. 5D) of the integral lead-in tube 28(1) to better prevent rotation of the integral lead-in tube 28(1) with respect to the ferrule holder body 32(1). The anti-twist surfaces 139(1), 139(2) may abut against the inner lead-in surface 126 of the integral lead-in tube 28(1) (see FIG. 5D) and thereby oppose rotation of the integral lead-in tube 28(1) in clockwise and counter-clockwise directions respectively and thereby prevent detachment.

The ferrule holder body 32(1) also may include the recess 144 which may include a first lock surface 142 and a second lock surface 129 which may be part of the outer surface 136 of the ferrule holder body 32(1). The first lock surface 142 and a second lock surface 129 may be configured to be integrated to the integral lead-in tube 28(1) with the bond 122 (FIG. 4A).

The integration may occur with the bond 122 so that they do not detach from one another. The first lock surface 142 and a second lock surface 129 may face perpendicular to the optical alignment surface $A_1$ to thereby resist movement of the integral lead-in tube 28(1) relative to the ferrule holder body 32(1) along the optical axis $A_1$ when the recess 144 may be encapsulated or filled with a portion 143 (FIG. 4A) of the integral lead-in tube 28(1) to form a mechanical lock.

The outer surface 136 may also include the recess floor surface 145 of the recess 144. The recess floor surface 145 may connect the first lock surface 142 and the second lock surface 129. The recess floor surface 145 may be integrated with the integral lead-in tube 28(1) with the bond 122 (FIG. 4A) to prevent the integral lead-in tube 28(1) from departing the recess 144.

With continued reference to FIGS. 6A-6D, the outer surface 136 may also include a first rear surface 137 and a second rear surface 147. The first rear surface 137 may attach the inner body surface 111 to the second rear surface 147. The second rear surface 147 may attach the first rear surface 137 to the first lock surface 142. The second rear surface 147 may be tapered to a greater distance from the optical axis $A_1$ so that the first lock surface 142 may be able to at least partially face the front end 108 of the ferrule holder body 32(1) and thereby form the recess 144. Both the first rear surface 137 and the second rear surface 147 may be integrated with the integral lead-in tube 28(1) via the bond 122 (FIG. 4A) to prevent detachment.

Figure 7A:
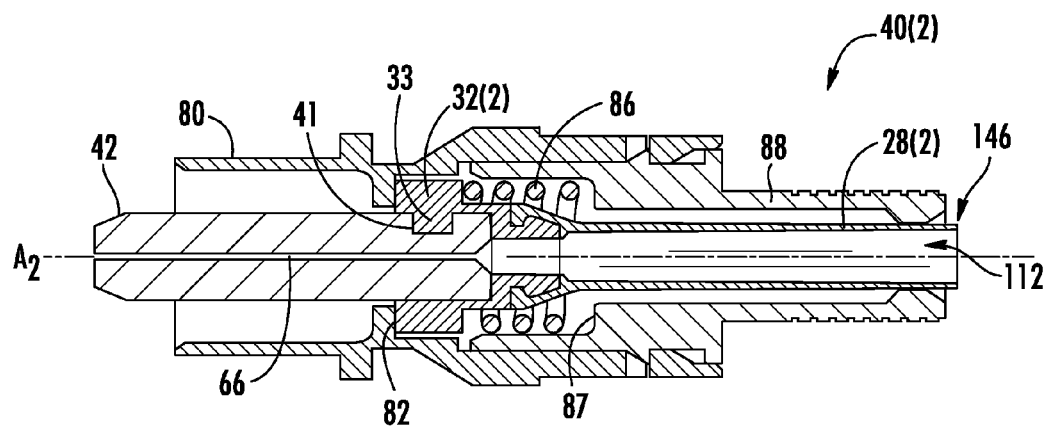
FIGS. 7A and 7B are side views of second and third examples of fiber optic connector sub-assemblies including additional examples of the lead-in tube, respectively, one with a protruding untapered end and one with a protruding tapered end, respectively.

FIG. 7A is a side cross-sectional view of a second example of a fiber optic connector sub-assembly 40(2). The fiber optic connector sub-assembly 40(2) may share the same components as depicted in FIG. 4A except an integral lead-in tube 28(2). The fiber optic connector sub-assembly 40(2) may include at least a portion 146 of the integral lead-in tube 28(2) to be disposed outside of the crimp body 88. The portion 146 may enable the optical fiber 34 to be more easily inserted into the lead-in bore 112. A ferrule holder body 32(2) in FIG. 7A may or may not be the same as the ferrule holder body 32(1) provided earlier in FIG. 2.

Figure 7B:
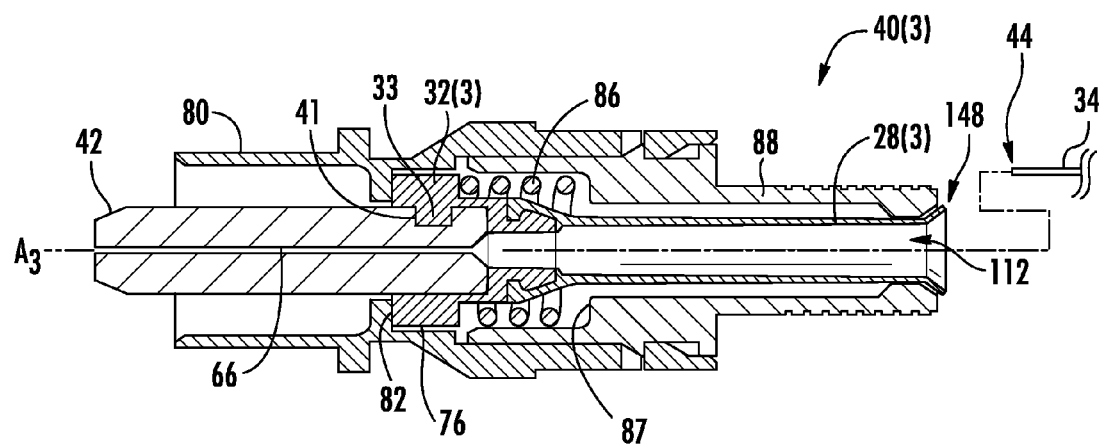

FIG. 7B is a side cross-sectional view of a third example of a fiber optic connector sub-assembly 40(3). The fiber optic connector sub-assembly 40(3) may share the same components as depicted in FIG. 4A except for an integral lead-in tube 28(3). The fiber optic connector sub-assembly 40(3) may include a funnel 148 at a rear end of the integral lead-in tube 28(3) to guide the optical fiber 34 into the lead-in bore 112. The funnel 148 may enable the optical fiber 34 to be more easily inserted into the lead-in bore 112. A ferrule holder body 32(3) in FIG. 7B may or may not be the same as the ferrule holder body 32(1) provided earlier in FIG. 2.

Figure 8:
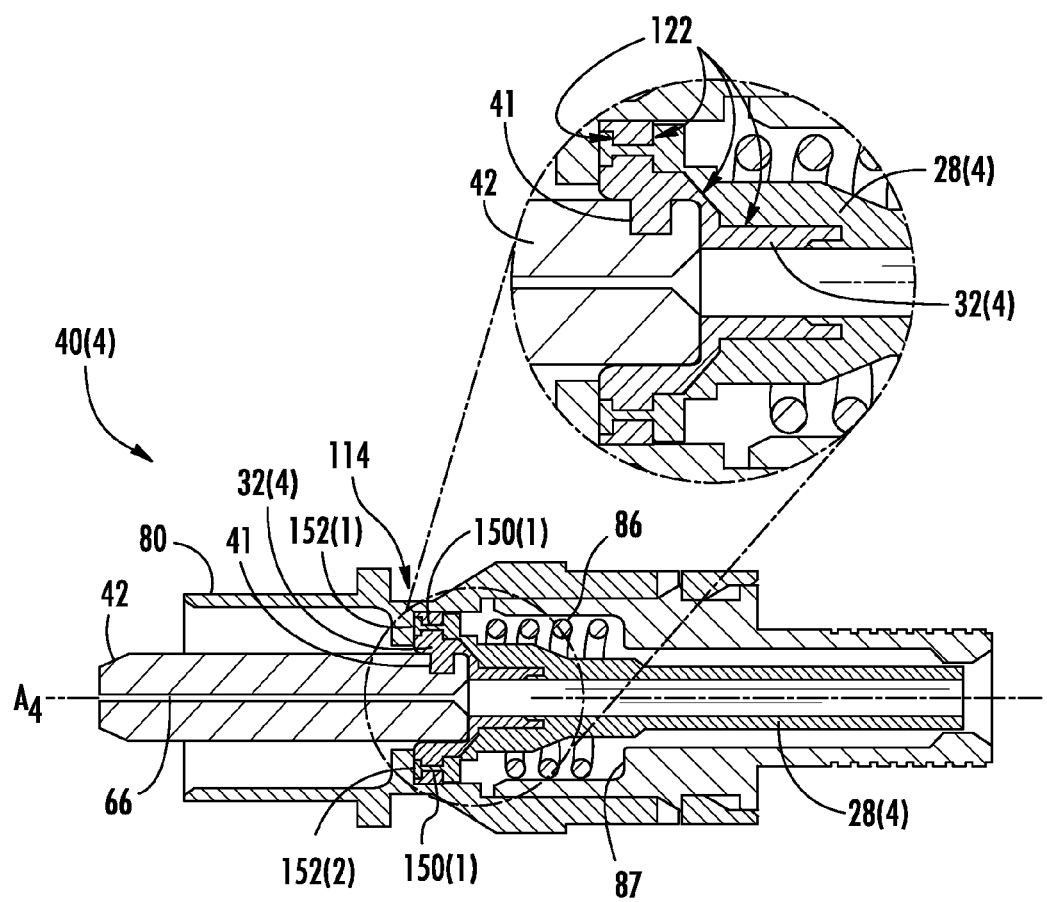
FIG. 8 is a side cross-sectional view of a fourth example of a ferrule holder of a fiber optic connector sub-assembly.

FIG. 8 is a side cross-sectional view of a fourth example of a fiber optic connector sub-assembly 40(4). The fiber optic connector sub-assembly 40(4) may share the same components as depicted in FIG. 4A except for a ferrule holder 26(4) including an integral lead-in tube 28(4) and a ferrule holder body 32(4). The fiber optic connector sub-assembly 40(4) may include at least one second internal passage 150(1), 150(2) parallel or substantially parallel to the optical axis $A_1$. At least a portion 152(1), 152(2) of the front end 114 of the integral lead-in tube 28(4) may be disposed through the at least one second internal passage 150(1), 150(2). The portions 152(1), 152(2) enable the integral lead-in tube 28(4) to be secured to the ferrule holder body 32(4) by a mechanical lock through the at least one second internal passage 150(1), 150(2). The mechanical lock prevents the portion 152(1), 152(2) from passing through the at least one second internal passage 150(1), 150(2). The front end 114 of the integral lead-in tube 28(4) is integrated to the ferrule holder body 32(4) via the bonds 122 which form where the integral lead-in tube 28(4) abuts against the ferrule holder body 32(4).

Figure 9C:
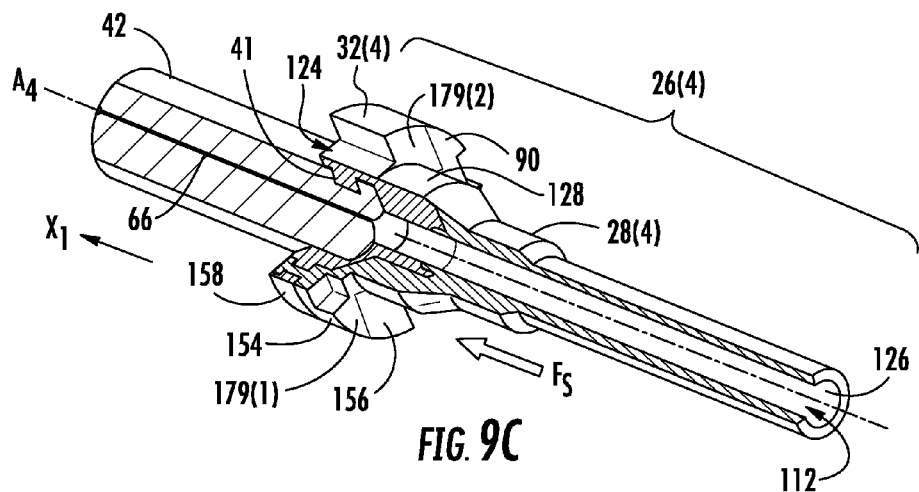
Figure 9D:
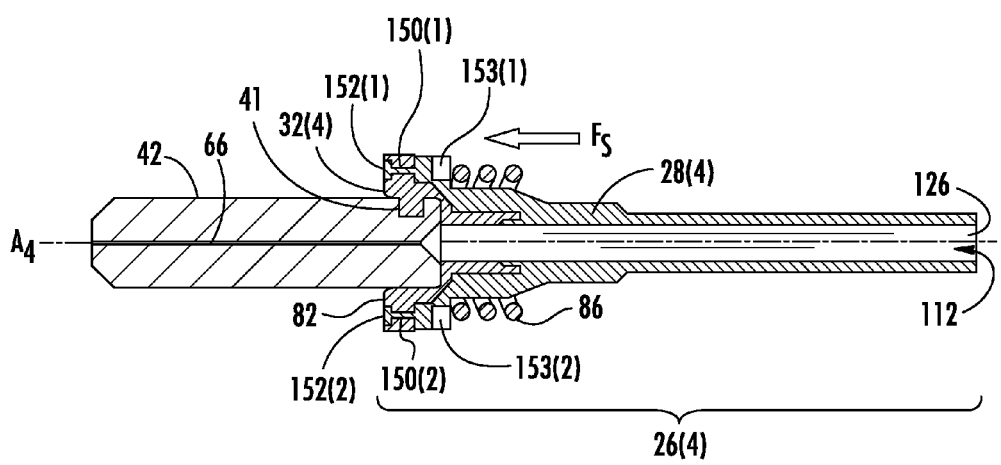

FIGS. 9A-9D are a perspective, side, perspective partial cross-sectional, and side cross-sectional views, respectively, of the ferrule holder 26(4) with the ferrule 42. FIGS. 9A-9D depict a subset of the components in FIG. 8. FIG. 9A shows the alignment notch 124 in the ferrule holder body 32(4) to prevent the ferrule holder body 32(4) from moving angularly with respect to the inner housing 80. Additionally, the integral lead-in tube 28(4) forms at least a portion 154 of the spring seating surface 90 and the ferrule holder body 32(4) forms at least another portion 156 of the spring seating surface 90. Accordingly, the spring seating surface 90 comprises the portion 154 of the front end 114 of the integral lead-in tube 28(4) pushing against the ferrule holder body 32(4) with the spring force $F_S$ (FIG. 9D). Further, a portion 158 of the ferrule holder body 32(4) may be disposed adjacent to the portion 154 of the integral lead-in tube 28(4). In this manner, the spring force $F_S$ (as discussed earlier in relation to FIG. 4A) may push a portion 154 of the front end 114 of the integral lead-in tube 28(4) against the ferrule holder body 32(4). In this way, a mechanical lock may be formed utilizing the spring force $F_S$ to maintain the integral lead-in tube 28(4) integrated with the rear end 30 of the ferrule holder body 32(4).

The front end 114 of the integral lead-in tube 28(4) may include at least one relief notch 153(1), 153(2) which form a cavity shape, at a portion of the spring seating surface 90. The relief notch 153(1), 153(2) may allow for easier manufacturing of the integral lead-in tube 28(4) via an overmold manufacturing operation. In this manner, the relief notch 153(1), 153(2) may be used for gating in the overmold operation where semi-liquid plastic may flow into the mold. As part of the overmold operation, excess material may collect in the relief notch 153(1), 153(2) and will not interfere with a lead-in pressure surface 179(1), 179(2) of the integral lead-in tube 28(4) which may, along with the spring seating surface 90, receive a spring force $F_S$ from the spring 86. By recessing the relief notch 153(1), 153(2) relative to the lead-in pressure surface 179(1), 179(2), the "bump" won't interfere with the spring 86.

It is noted that the ferrule holder 26(4) may alternatively be made without the at least one second internal passage 150(1), 150(2) and the portion 152(1), 152(2). Instead, a volume taken up by these features may be replaced by the ferrule holder body 32(4). In this manner, the ferrule holder body 32(4) may be manufactured with relatively inexpensive A-B mold techniques involving only a single axis of movement to reduce manufacturing cost.

Figure 10:
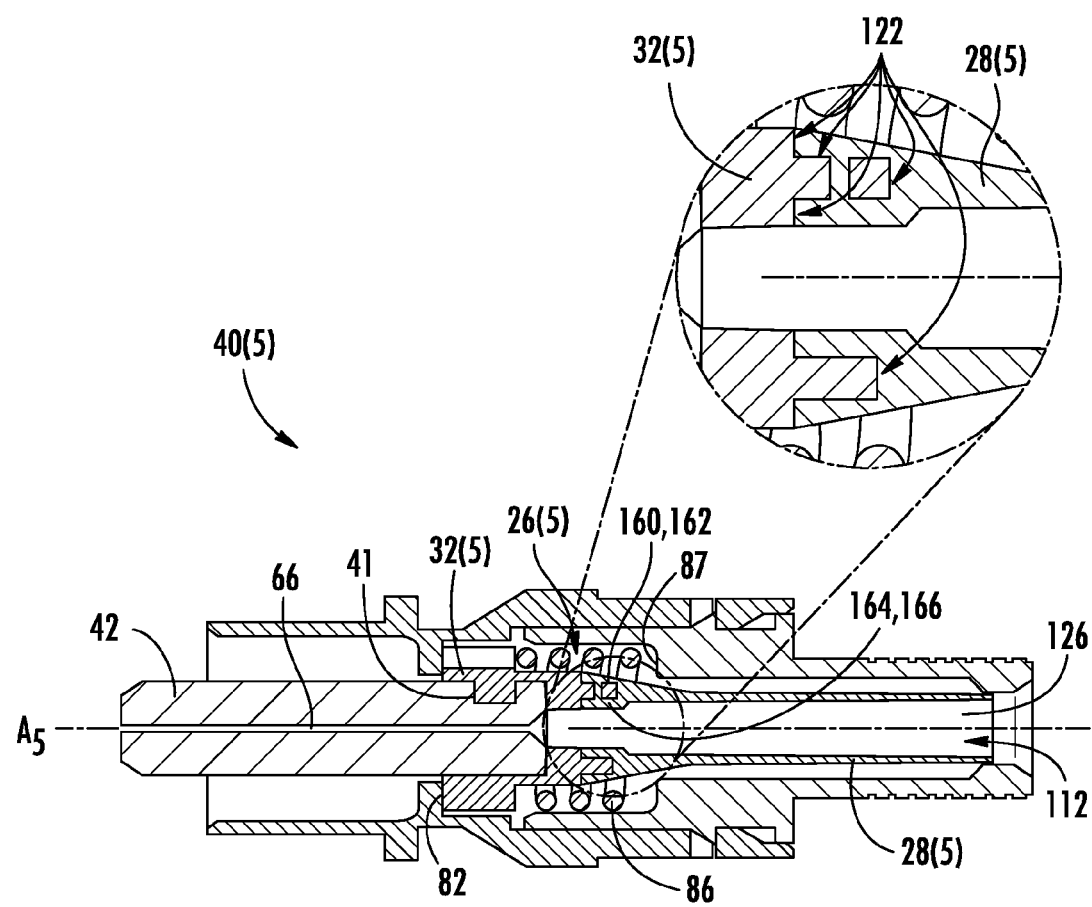
FIG. 10 is a side cross-sectional view of the ferrule and a fifth example of a ferrule holder of a fiber optic connector sub-assembly, the ferrule holder including a ferrule holder body.

FIG. 10 is a side cross-sectional view of another example of a fiber optic connector sub-assembly 40(5). The fiber optic connector sub-assembly 40(5) may share the same components as depicted in FIG. 4A except for a ferrule holder 26(5) including an integral lead-in tube 28(5) and a ferrule holder body 32(5). The fiber optic connector sub-assembly 40(5) may include a portion 160 of the outer surface 136 of the ferrule holder body 32(1) and a portion 164 of an inner body surface 166 of the ferrule holder body 32(5) abutting against the integral lead-in tube 28(5). In this manner, the integral lead-in tube 28(5) may be better integrated with the rear end 30 of the ferrule holder body 32(5) via the bond 122.

Figure 11A:
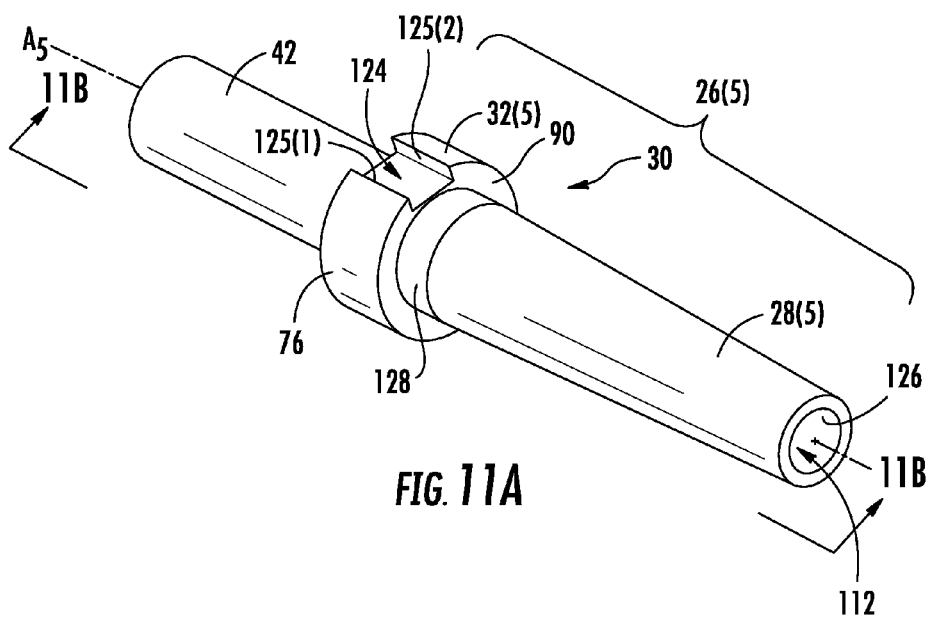
FIGS. 11A-11D are perspective, side, exploded perspective, and perspective cross-sectional views, respectively, of the ferrule holder of FIG. 10 employing an integral lead-in tube and supporting the ferrule of FIG. 10.
Figure 11B:
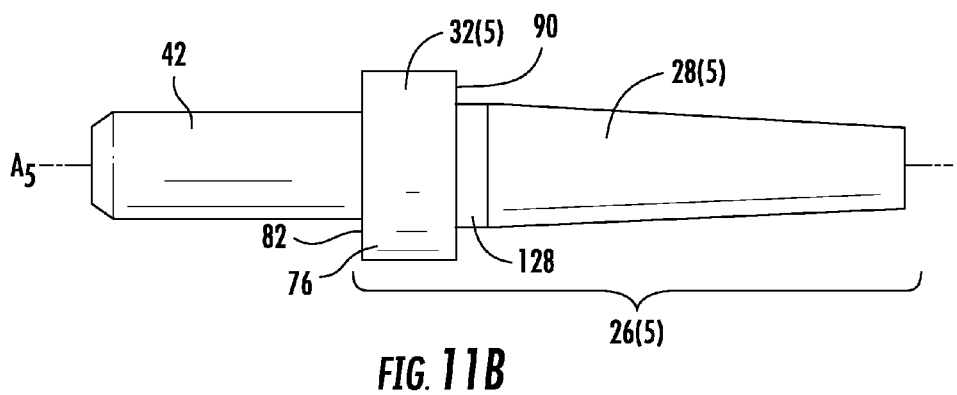
Figure 11C:
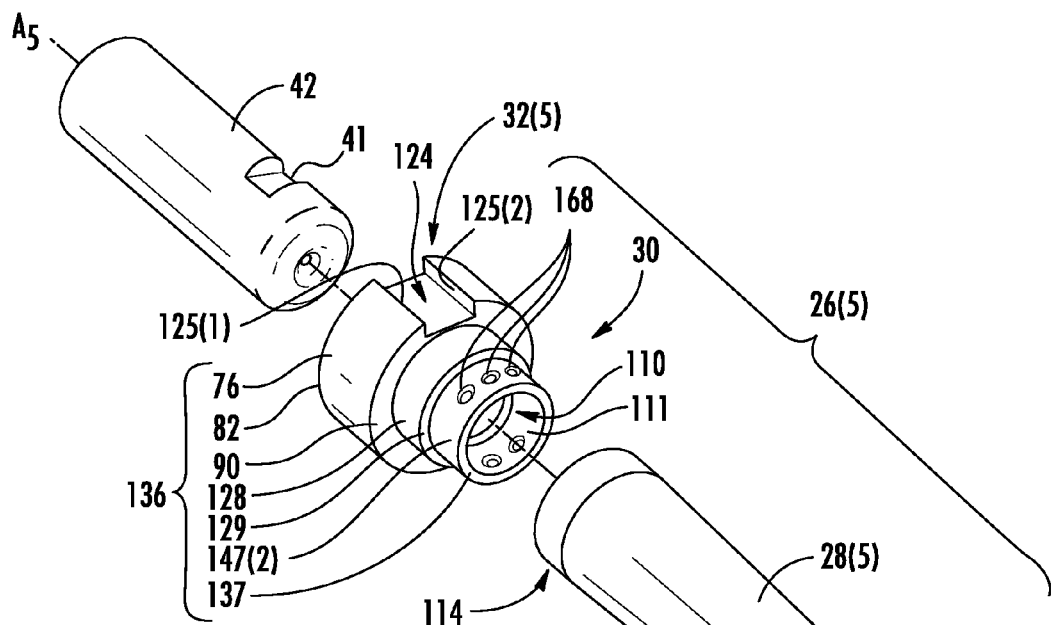

The ferrule holder body 32(5) may also include at least one through hole 168 (see FIG. 11C). The at least one through hole 168 may be integrated with the integral lead-in tube 28(5) with the bond 122 (FIG. 10) and thereby prevent the ferrule holder body 32(5) from detaching from the integral lead-in tube 28(5).

Figure 11D:
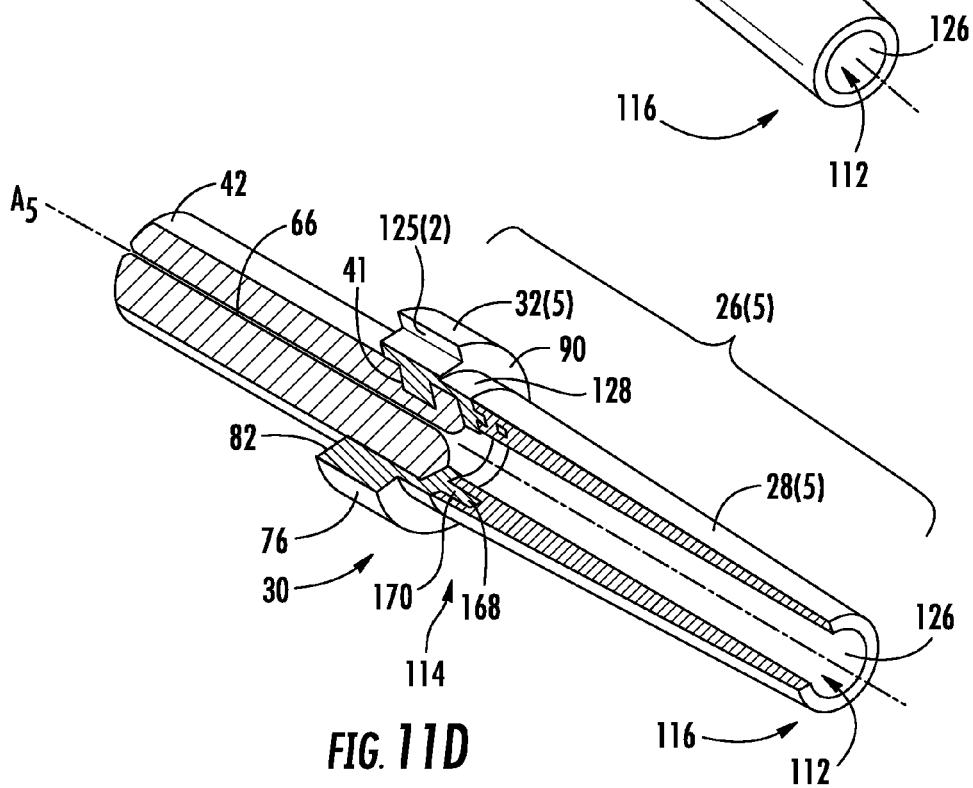
Figure 12A:
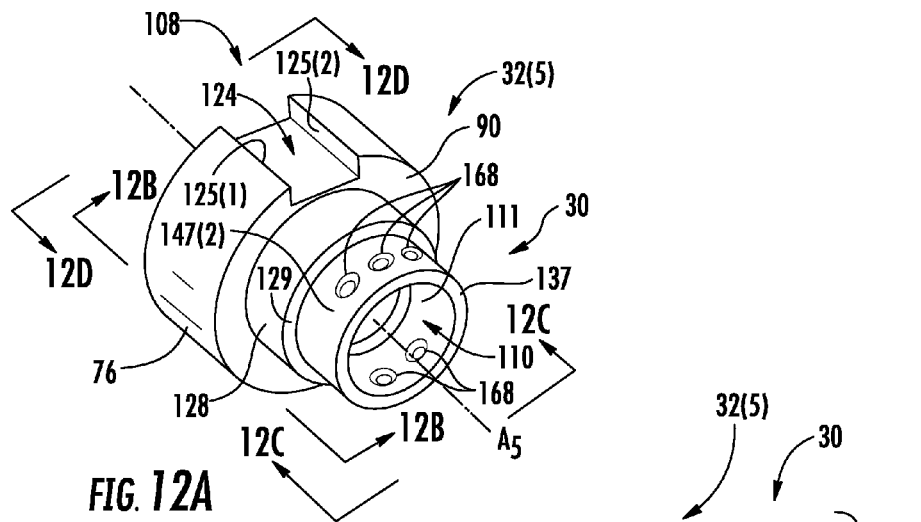
FIGS. 12A-12D are perspective, side, back, and front views, respectively, of the ferrule holder body of FIG. 10.
Figure 12C:
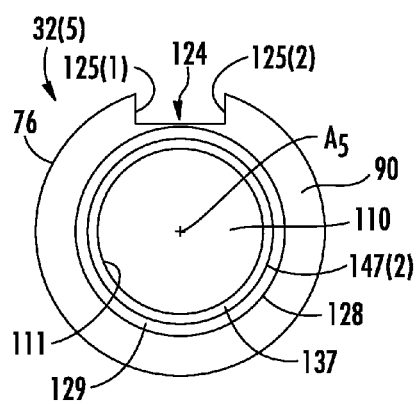
Figure 12B:
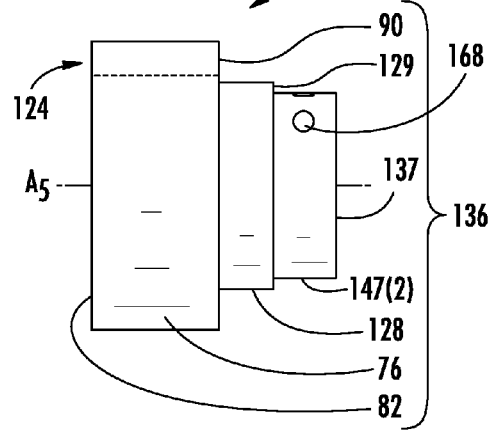
Figure 12D:
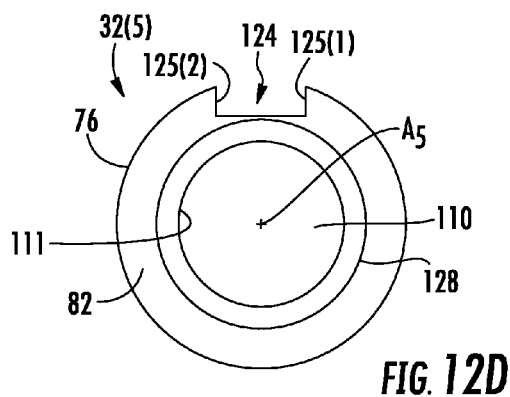

FIGS. 11A-11D are perspective, side, exploded perspective, and perspective cross-sectional views of the ferrule 42 and ferrule holder 26(5) of FIG. 10. FIGS. 11A-11D depict a subset of the components in FIG. 10. As shown in FIG. 11C, the rear end 30 of the ferrule holder body 32(5) may include the through holes 168 extending from the internal passage 110 to the outer surface 136 of the ferrule holder body 32(5). The second rear surface 147(2) may include the through holes 168. In the ferrule holder body 32(5), the second rear surface 147(2) may attach the first rear surface 137 to the second lock surface 129. The second rear surface 147(2) may be concentric to the optical axis $A_5$ to enable more efficient manufacturing. As depicted in FIG. 11D, a portion 170 of the front end 114 of the integral lead-in tube 28(5) may be disposed within the through holes 168. In this way, a mechanical lock is formed at the through holes 168 to better integrate the front end 114 of the integral lead-in tube 28(5) to the rear end 30 of the ferrule holder body 32(5).

FIGS. 12A-12D show perspective, side, back, and front views of the ferrule holder body 32(5), respectively. FIGS. 12A-12D depict a subset of the components in 11A-11D. The outer surface 136 of the ferrule holder body 32(5) may include the first rear surface 137, the second rear surface 147(2), the second lock surface 129, the spring alignment surface 128, the spring seating surface 90, the body alignment surface 76, and the abutment surface 82. These components of the outer surface 136 have already been introduced. The integral lead-in tube 28(5) may be integrated as part of any portion of the outer surface 136 and the inner body surface 111 by the bond 122 (FIG. 10). In this manner, the optical fiber 34 may more efficiently be aligned to the rear end 72 of the ferrule 42.

Figure 13A:
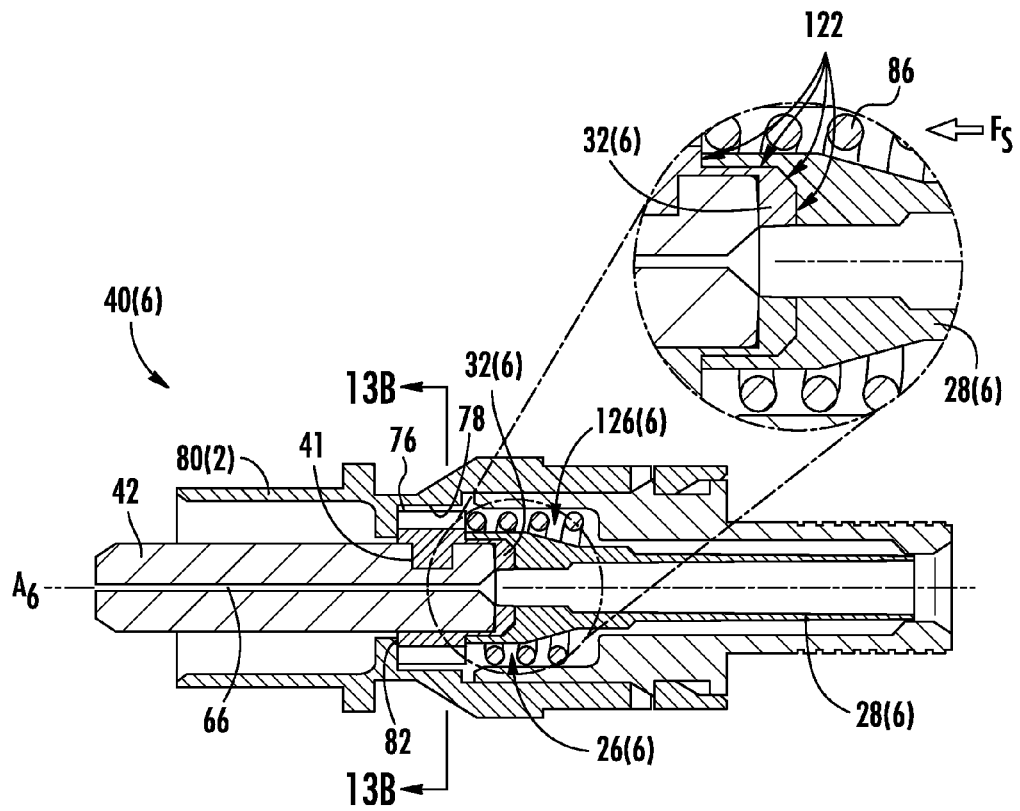
FIG. 13A is a side cross-sectional view of the ferrule and a sixth example of an ferrule holder of a fiber optic connector sub-assembly, the ferrule holder including a ferrule holder body.
Figure 13B:
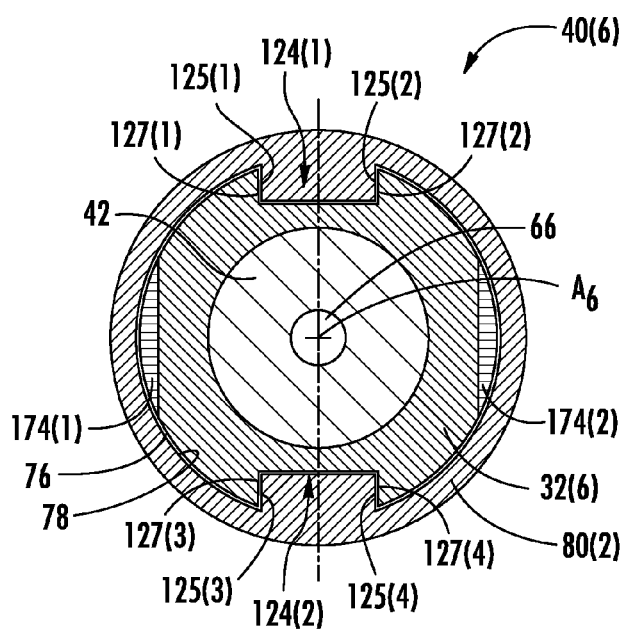
FIG. 13B is a full cross-sectional view parallel to an optical axis of the fiber optic connector sub-assembly of FIG. 13A.

FIG. 13A is a side cross-sectional view of a sixth example of a fiber optic connector sub-assembly 40(6). The fiber optic connector sub-assembly 40(6) may share the same components as depicted in FIG. 4A except for an integral lead-in tube 28(6) and a ferrule holder body 32(6). Also, an inner housing 80(2) may be different from the inner housing 80 of FIG. 4A by the inclusion of angular stopping surfaces 127 (1)-127(4) as depicted in FIG. 13B.

The inner housing 80(2) is discussed first to establish a foundation for discussing the ferrule holder body 32(6). In this regard, FIG. 13B is a full cross-sectional view parallel to the optical axis $A_6$ of the fiber optic connector sub-assembly 40(6) of FIG. 13A. The ferrule holder body 32(6) may be disposed within the inner housing 80(2) in such a manner that the body alignment surface 76 of the ferrule holder body 32(6) and the at least one second extension 174(1), 174(2) of the integral lead-in tube 28(6) (FIGS. 14A-14D) may or may not abut against the housing alignment surface 78 of the inner housing 80(2).

The ferrule holder body 32(6) may also be disposed in such a manner that the spring force Fs from the spring 86 (FIGS. 13A and 14D) may be applied to a lead-in pressure surface 179(1), 179(2) of the integral lead-in tube 28(6). In this manner, the spring force $F_S$ may act as a mechanical lock to maintain the integral lead-in tube 28(6) integrated with the ferrule holder body 32(6).

The ferrule holder body 32(6) may also include at least one alignment notch 124(1), 124(2) in the ferrule holder body 32(6) to prevent the ferrule holder body 32(6) from moving angularly with respect to the inner housing 80(2). Anti-rotation surfaces 125(1)-125(4) of the at least one alignment notch 124(1), 124(2) may prevent angular movement of the ferrule holder body 32(6) by abutting against angular stopping surfaces 127(1)-127(4) of the inner housing 80(2). Preventing angular movement of the ferrule holder body 32(6) may be beneficial when polishing the end face 68 of the ferrule 42 and aligning the ferrule 42 to the complementary fiber optic receptacle, particularly when the ferrule 42 may comprise an angled physical contact (APC) ferrule wherein the end face 68 of the ferrule 42 may not be orthogonal to the optical axis $A_6$.

Figure 14A:
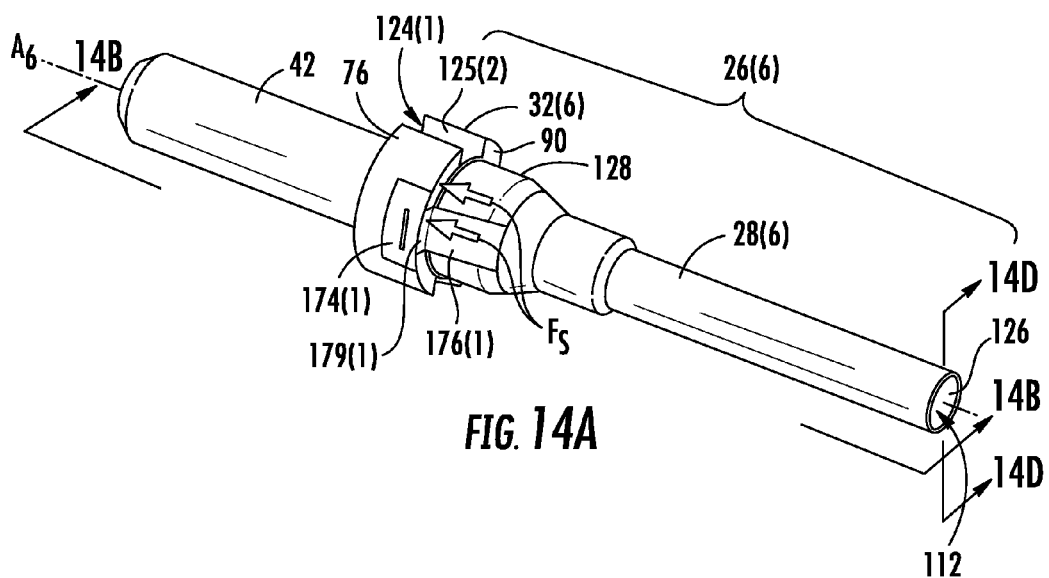
FIGS. 14A-14D are perspective, side, exploded perspective, and side cross-sectional views, respectively, of the ferrule and the ferrule holder of FIG. 13A.
Figure 14B:
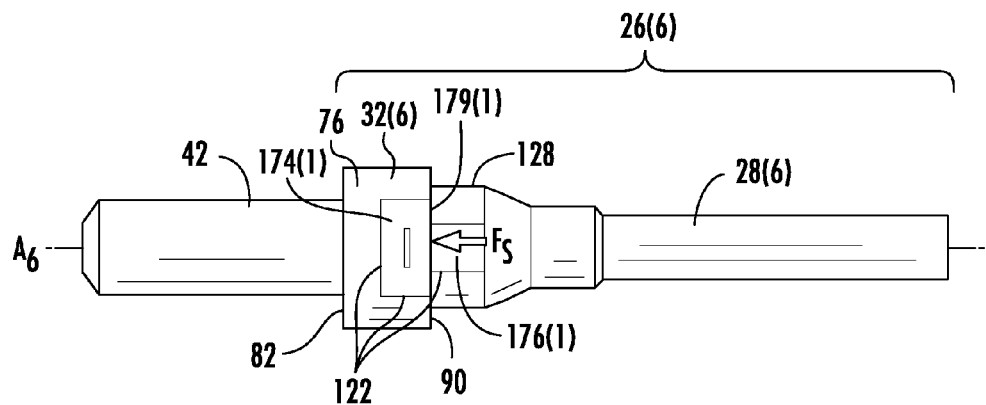
Figure 14C:
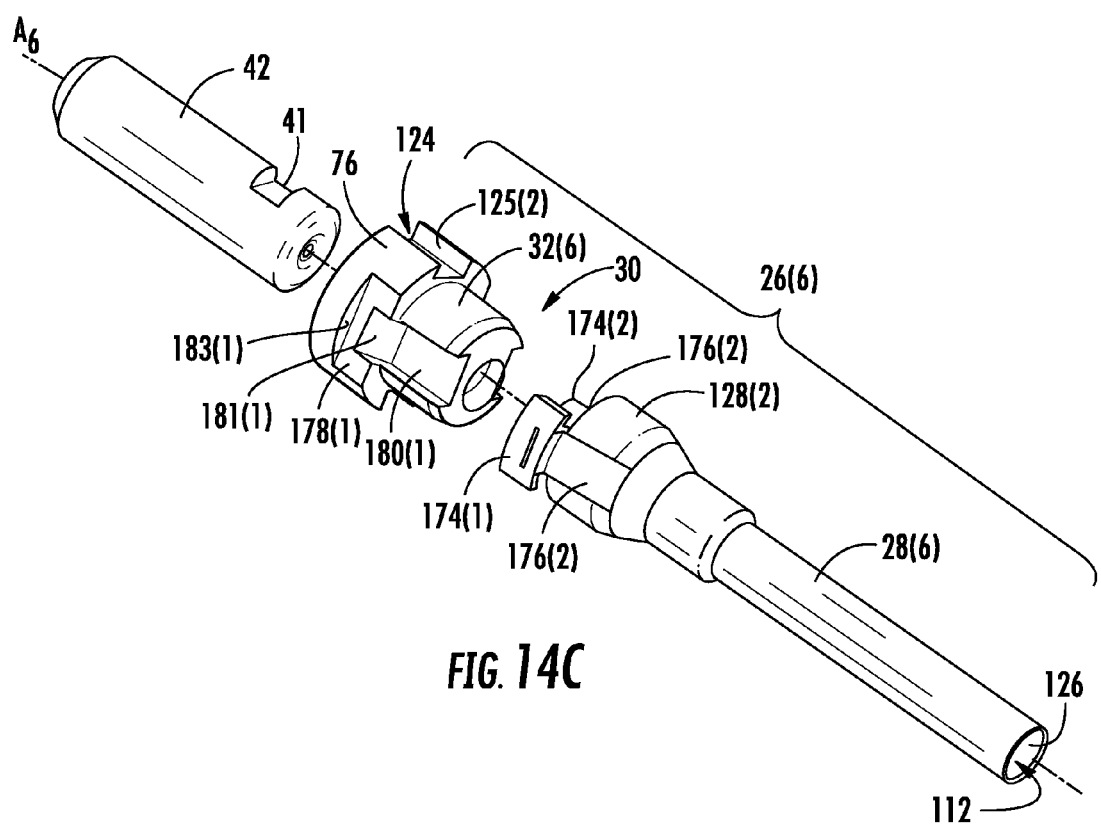
Figure 14D:
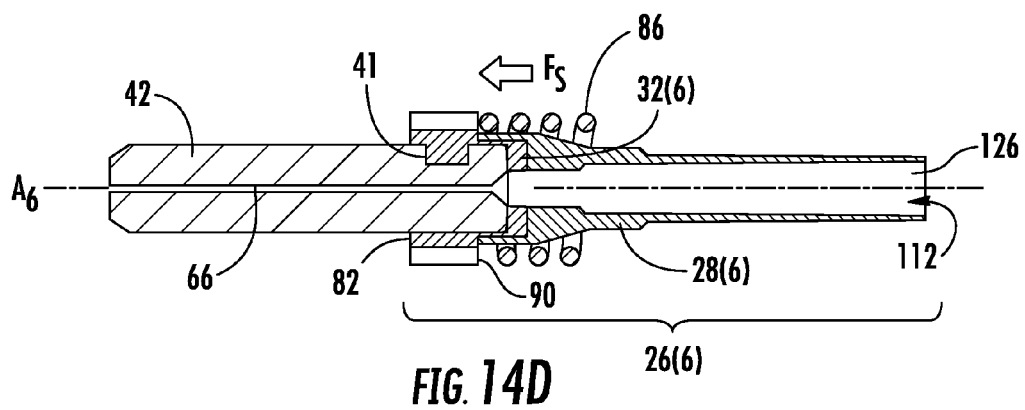

Now the inner housing 80(2) has been introduced, details of the ferrule holder body 32(6) are discussed in FIGS. 14A-14D. A subset of the components in FIG. 13A are depicted in FIGS. 14A-14D. The ferrule 42 and ferrule holder 26(6) of FIG. 13A, including the ferrule holder body 32(6) and the integral lead-in tube 28(6) are shown in FIGS. 14A-14C in perspective, side, exploded perspective, and side partial cross-sectional views, respectively.

The ferrule holder body 32(6) may include the body alignment surface 76 to provide structure to the ferrule holder body 32(6) and to fit within the housing alignment surface 78 of the inner housing 80(2) as shown in FIG. 13A. The body alignment surface 76 and the housing alignment surface 78 may be parallel to the optical axis $A_6$. The body alignment surface 76 may be flush with the second extension 174(1), 174(2) of the integral lead-in tube 28(6), as shown in FIGS. 14A-14D, to allow easier insertion into the inner housing 80(2). The second extension 174(1) may also be attached to the ferrule holder body 32(6) with the bond 122 (FIG. 14B).

FIGS. 15A-15D are a perspective, side, front, and back views of the ferrule holder body 32(6), respectively. FIGS. 15A-15D depict a subset of the components in FIG. 13A. The ferrule holder body 32(6) may include a first recessed surface 180(1), 180(2), a second recessed surface 181(1), 181(2), and a third recessed surface 178(1), 178(2), which may be integrated with a first extension 176(1), 176(2) and a second extension 174(1), 174(2) of the integral lead-in tube 28(6) with the bond 122 (FIG. 14B) so the ferrule holder body 32(6) and the integral lead-in tube 28(6) do not detach. In this manner, the spring force Fs from the spring 86 may be applied to the lead-in pressure surface 179(1), 179(2) of the of the at least one second extension 174(1), 174(2) to force the second extension 174(1), 174(2) of the integral lead-in tube 28(6) against the third rear surface 183(1), 183(2) of the ferrule holder body 32(6) to form a mechanical lock. The mechanical lock may further secure the integral lead-in tube 28(6) to the ferrule holder body 32(6).

The ferrule holder body 32(6) may also include the spring seating surface 90, which may also receive a portion of the spring force $F_S$ from the spring 86 as depicted in FIGS. 13A and 14A. In this manner, the spring force Fs may be distributed between the spring seating surface 90 of the ferrule holder body 32(6) and the lead-in pressure surface 179(1), 179(2) of the integral lead-in tube 28(6).

With continuing reference to FIGS. 15A-15D, the ferrule holder body 32(6) may also include a first rear surface 137(2) and a second rear surface 147(3) integrated with the integral lead-in tube 28(6) with the bond 122 to prevent detachment. The second rear surface 147(3) may attach the first rear surface 137(2) to the spring seating surface 90. The first rear surface 137(2) may attach the second rear surface 147(3) to the inner body surface 111. The first rear surface 137(2) and the second rear surface 147(3) may be integrated with the integral lead-in tube 28(6) with the bond 122 to prevent disengagement.

The ferrule holder body 32(6) may also include a third rear surface 183(1), 183(2). The third rear surface 183(1), 183(2) may be orthogonal to the optical axis $A_6$ for easier manufacturing. The third rear surface 183(1), 183(2) may be integrated with the integral lead-in tube 28(6) with the bond 122 to prevent detachment.

Further, the at least one alignment notch 124(1), 124(2) may be included as part of the ferrule holder body 32(6). The alignment notch 124(1), 124(2) may include the anti-rotation surfaces 125(1)-125(4) to prevent rotation of the ferrule holder body 32(1) with respect to the inner housing 80(2). The anti-rotation surfaces 125(1)-125(4) may be straight or tapered and may abut the angular stopping surfaces 127(1)-127(4) of the inner housing 80(2) to thereby oppose angular movement of the ferrule holder body 32(6). In this manner, the ferrule 42 containing the optical fiber 34 may be prevented from angular movement, which may be beneficial as discussed earlier, for example, when polishing the end face 68 of the ferrule 42 and aligning the ferrule 42 to the complementary fiber optic receptacle, which may include an angled physical contact (APC) ferrule (not shown).

It is noted that the anti-rotation surfaces 125(1)-125(4) may be parallel to the optical axis $A_6$ to improve manufacturing efficiency and to allow translation parallel to the optical axis $A_6$. The alignment notch 124(1), 124(2) may be disposed adjacent to the body alignment surface 76 to enable the greater stability of the ferrule holder body 32(6) within the inner housing 80(2).

Figure 16:
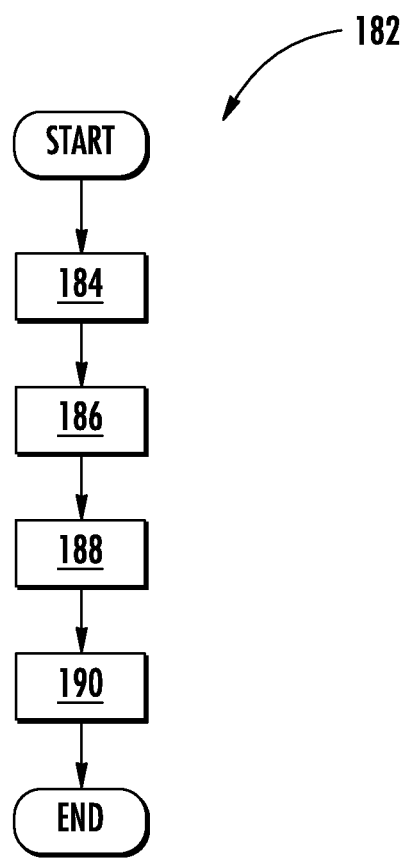
FIG. 16 is a flowchart diagram of an exemplary process of manufacturing a fiber optic connector sub-assembly as part of a fiber optic connector of FIG. 1A.

FIG. 16 is a flowchart diagram of an exemplary process 182 of manufacturing a fiber optic connector sub-assembly as part of a fiber optic connector. The process 182 in FIG. 16 will be described using the terminology and information provided above.

The process 182 may include providing the ferrule holder body 32(1) comprising the front end 108 opposite the rear end 30 along the optical axis $A_1$ (step 184 in FIG. 16). The internal passage 110 may extend therethrough along an optical axis $A_1$ from the rear end 30 of the ferrule holder body 32(1) to the front end 108 of the ferrule holder body 32.

The process 182 may also include overmolding the integral lead-in tube 28(1) upon the rear end 30 of the ferrule holder body 32(1) to form the ferrule holder 26(1) with the integral lead-in tube 28(1) integrated with the rear end 30 of the ferrule holder body 32 with the bond 122 (step 186 in FIG. 16). The integral lead-in tube 28(1) may include the inner lead-in surface 126 forming a lead-in bore 112. The overmolding may also include filling the recess 144 in the rear end 30 of the ferrule holder body 32(1) with the portion 143 (FIG. 4A) of the integral lead-in tube 28(1). The overmolding may also include the filling the lead-in notch 138 of the rear end 30 of the ferrule holder body 32 with a portion of the integral lead-in tube 28(1). The overmolding may further include filling the at least one second internal passage 150(1), 150(2) with a portion of the integral lead-in tube 28(1). The at least one second internal passage 150(1), 150(2) may be parallel or substantially parallel to the optical axis $A_1$. The overmolding may further include filling the through holes 168 of the rear end 30 of the ferrule holder body 32(1) with a portion of the integral lead-in tube 28(1). The overmolding may also include forming the at least a portion of a spring seating surface 90 of the ferrule holder 26 with a portion of the integral lead-in tube 28(1). The overmolding may comprise forming at least a portion of the body alignment surface 76 with a portion of the integral lead-in tube 28(1) and the second portion of the body alignment surface 76 may comprise the ferrule holder body 32(1).

The process 182 may also include receiving the ferrule holder 26(1) and the spring 86 within the inner housing 80 (step 188 in FIG. 16). The receiving the spring 86 may also include applying the spring force $F_S$ to press a portion of the integral lead-in tube 28(1) against the ferrule holder body 32(1). The receiving the ferrule holder 26(1) within the inner housing 80 may also include the inner housing 80 pressing the integral lead-in tube 28(1) against the ferrule holder body 32(1). The receiving the ferrule holder 26(1) within the inner housing 80 may include aligning the ferrule holder 26(1) within the inner housing 80 by abutting the body alignment surface 76 of the ferrule holder 26(1) against the inner housing 80.

Figure 17:
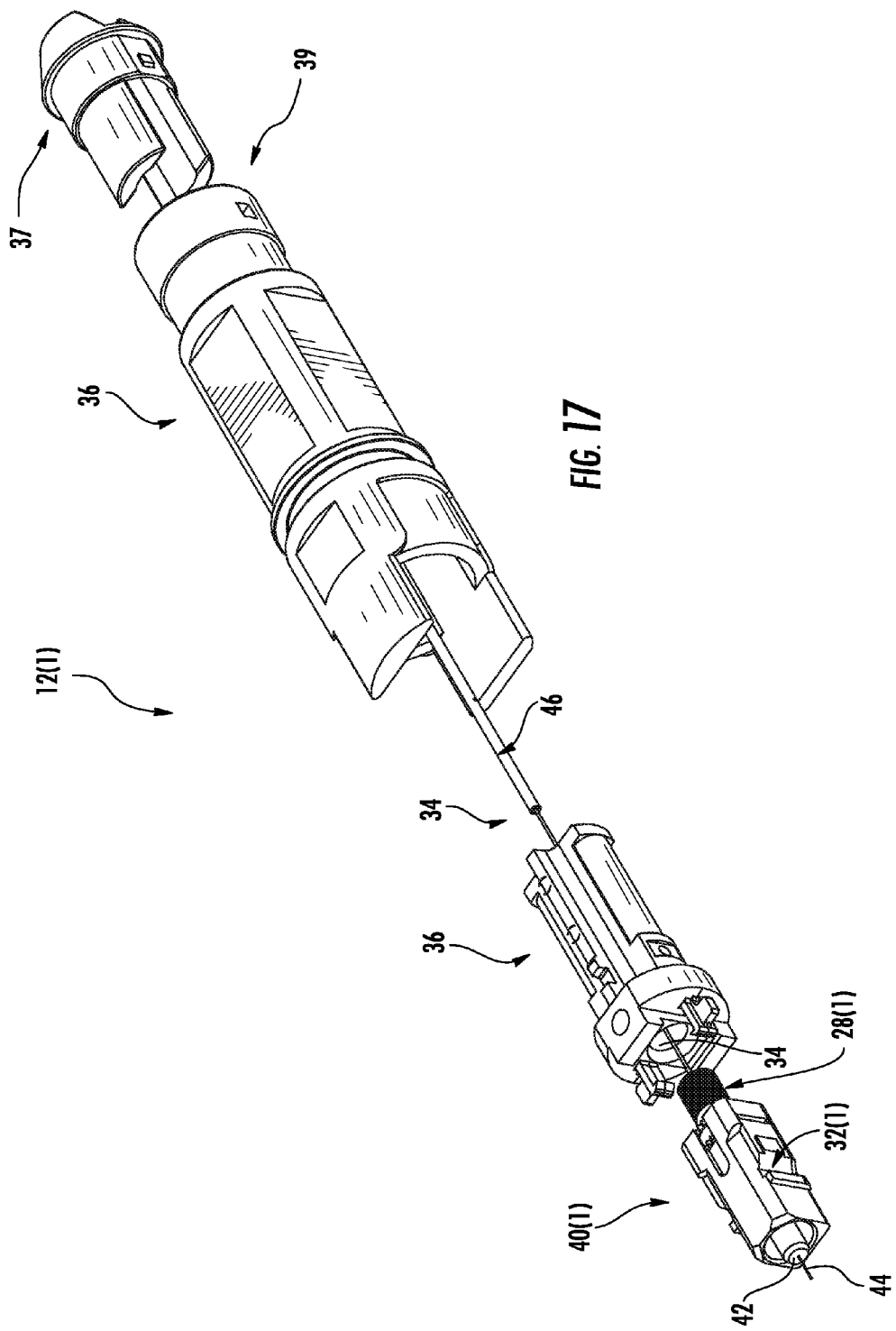
FIG. 17 is a perspective exploded view of an optical fiber being routed through the fiber optic connector sub-assembly of FIG. 2 that can employ the ferrule holders disclosed herein.

As depicted in FIG. 17, the process 182 may also include receiving the optical fiber 34 though the integral lead-in tube 28(1), the ferrule holder body 32(1), and the ferrule 42 (step 190 in FIG. 17). The optical fiber 34 may also be received through other components of the fiber optic connector 12(1), for example the plug housing 36 and an end cap 37. The plug housing 36 may also include the end cap 37 which may provide support for the optical fiber 34 at the rear end 39 of the plug housing 36.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. Non-limiting examples of bend-insensitive, or bend resistant, optical fibers are ClearCurve® Multimode or single-mode fibers commercially available from Corning Incorporated. Suitable fibers of these types are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. For example, features of the ferrule holders 26(1)-26(6) may be interchanged and combined in permutations not disclosed. Further, the ferrule holders 26(1)-26(6) discussed herein may be compatible with fiber optic connectors having spring-loaded ferrule holders. It is also noted that the ferrule holders 26(1)-26(6) discussed herein may also be used with any type of connector, for example, SC, LC, or MU.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:
1. A ferrule holder for a fiber optic connector sub-assembly, comprising:
   a ferrule holder body comprising a front end opposite a rear end along an optical axis, and an internal passage extending from the front end to the rear end along the optical axis; and
   an integral lead-in tube having a front end integrated with the rear end of the ferrule holder body, the integral lead-in tube further comprising a lead-in bore extending in the optical axis from a rear end of the integral lead-in tube to the front end of the integral lead-in tube, wherein the integral lead-in tube is configured to receive and guide an end portion of an optical fiber along the optical axis through the rear end of the ferrule holder body and into the internal passage of the ferrule holder body, wherein the integral lead-in tube is integrated into the ferrule holder body through a bond, and wherein the rear end of the ferrule holder body includes an outer surface, and an inner lead-in surface of the integral lead-in tube at least partially encapsulates the outer surface.

2. The ferrule holder of claim 1, wherein the outer surface of the ferrule holder body comprises a lead-in notch configured to prevent rotation of the integral lead-in tube relative to the ferrule holder body.

3. The ferrule holder of claim 2, wherein at least a portion of an inner lead-in surface is disposed within the lead-in notch.

4. The ferrule holder of claim 1, wherein the outer surface of the ferrule holder body comprises a retaining surface of a recess configured to align the integral lead-in tube relative to the internal passage of the ferrule holder body along the optical axis.

5. The ferrule holder of claim 1, wherein the rear end of the integral lead-in tube includes a funnel to guide the optical fiber into the lead-in bore.

6. The ferrule holder of claim 1, wherein the inner lead-in surface of the integral lead-in tube is concentric about the optical axis.

7. A ferrule holder for a fiber optic connector sub-assembly, comprising:
  a ferrule holder body comprising a front end opposite a rear end along an optical axis, and an internal passage extending from the front end to the rear end along the optical axis; and
  an integral lead-in tube having a front end integrated with the rear end of the ferrule holder body, the integral lead-in tube further comprising a lead-in bore extending in the optical axis from a rear end of the integral lead-in tube to the front end of the integral lead-in tube,
  wherein the integral lead-in tube is configured to receive and guide an end portion of an optical fiber along the optical axis through the rear end of the ferrule holder body and into the internal passage of the ferrule holder body, and
  wherein an outer lead-in surface of the integral lead-in tube includes a tapered portion wherein a width of the outer lead-in surface adjacent to the rear end of the ferrule holder body is greater than a width of the lead-in surface adjacent to the rear end of the integral lead-in tube.

8. The ferrule holder of claim 1, wherein the ferrule holder body includes at least one second internal passage parallel or substantially parallel to the optical axis.

9. The ferrule holder of claim 8, wherein a portion of the front end of the integral lead-in tube is disposed through the at least one second internal passage.

10. The ferrule holder of claim 1, wherein the ferrule holder body includes through holes extending from the internal passage to the outer surface of the ferrule holder body, wherein a portion of the front end of the lead-in tube is disposed within the through holes.

11. A ferrule holder for a fiber optic connector sub-assembly, comprising:
  a ferrule holder body comprising a front end opposite a rear end along an optical axis, and an internal passage extending from the front end to the rear end along the optical axis; and
  an integral lead-in tube having a front end integrated with the rear end of the ferrule holder body, the integral lead-in tube further comprising a lead-in bore extending in the optical axis from a rear end of the integral lead-in tube to the front end of the integral lead-in tube,
  wherein the integral lead-in tube is configured to receive and guide an end portion of an optical fiber along the optical axis through the rear end of the ferrule holder body and into the internal passage of the ferrule holder body, and
  wherein a portion of an outer surface of the ferrule holder body and an inner body surface of the ferrule holder body abut against the integral lead-in tube.

12. A fiber optic connector sub-assembly, comprising:
  a housing including a front end and a rear end;
  a ferrule holder disposed within the housing, the ferrule holder comprising:
    a ferrule holder body comprising a front end opposite a rear end along an optical axis, an internal passage extending from the front end to the rear end along the optical axis; and
    an integral lead-in tube having a front end integrated with the rear end of the ferrule holder body, the integral lead-in tube further comprising a lead-in bore extending in the optical axis from a rear end of the integral lead-in tube to the front end of the integral lead-in tube, the rear end of the integral lead-in tube disposed through the rear end of the housing; and
  a ferrule having a front end and a rear end, the rear end of the ferrule at least partially disposed within the internal passage at the front end of the ferrule holder body, the front end of the ferrule being at least partially disposed within the front end of the housing,
  wherein the integral lead-in tube is configured to receive and guide an end portion of an optical fiber along the optical axis through the rear end of the ferrule holder body and into the internal passage of the ferrule holder body and into the rear end of the ferrule,
  wherein the ferrule holder includes a spring seating surface receiving a spring force from a spring, and the spring force is directed towards the front end of the ferrule holder body, and
  wherein the spring seating surface comprises a portion of the front end of the integral lead-in tube.

13. The fiber optic connector sub-assembly of claim 12, wherein at least a portion of the spring force pushes a portion of the front end of the integral lead-in tube against the ferrule holder body.

14. A method of creating a connectorized fiber optic cable, comprising:
  providing a ferrule holder body comprising a front end opposite a rear end along an optical axis, an internal passage therethrough extending along the optical axis from the rear end of the ferrule holder body to the front end of the ferrule holder body,
  overmolding an integral lead-in tube upon the rear end of the ferrule holder body to form a ferrule holder with the integral lead-in tube which is integrated with the rear end of the ferrule holder body, the integral lead-in tube including an inner lead-in surface forming a lead-in bore;
  receiving a portion of a ferrule in the internal passage;
  receiving the ferrule holder within an inner housing; and receiving an optical fiber through the integral lead-in tube, the ferrule holder body, and the ferrule.

15. The method of claim 14, wherein the overmolding includes filling a recess in the rear end of the ferrule holder body with a portion of the integral lead-in tube.

16. The method of claim 14, wherein the overmolding includes filling a lead-in notch of the rear of the ferrule holder body with a portion of the integral lead-in tube.

17. The method of claim 14, wherein the overmolding includes filling at least one second internal passage of the ferrule holder body with a portion of the integral lead-in tube, and the at least one second internal passage is parallel or substantially parallel to the optical axis.

18. The method of claim 14, wherein the overmolding includes filling at least one through hole of the rear end of the ferrule holder body with a portion of the integral lead-in tube.

19. The method of claim 14, wherein the receiving the ferrule holder within the inner housing comprises receiving a spring within the inner housing and applying a spring force with the spring to press a portion of the integral lead-in tube against the ferrule holder body.

20. The method of claim 19, wherein the overmolding includes forming at least a portion of a spring seating surface of the ferrule holder with a portion of the integral lead-in tube.

21. A fiber optic connector, comprising:
   a coupling nut configured to engage threads of a complementary connector;
   a plug housing configured to receive an inner housing;
   a pulling cap configured to protect fiber optic components from contaminants; and
   a fiber optic connector sub-assembly comprising:
      the inner housing including a front end and a rear end;
      a ferrule holder disposed within the inner housing, the ferrule holder comprising:
         a ferrule holder body comprising a front end opposite a rear end along an optical axis, an internal passage extending from the front end to the rear end along the optical axis;
         an integral lead-in tube having a front end integrated with the rear end of the ferrule holder body, the lead-in tube further comprising a lead-in bore extending in the optical axis from a rear end of the lead-in tube to the front end of the lead-in tube, the rear end of the integral lead-in tube disposed through the rear of the inner housing; and
      a ferrule having a front end and a rear end, the rear end of the ferrule at least partially disposed within the internal passage at the front end of the ferrule holder body, the front end of the ferrule at least partially disposed within the front end of the inner housing,
      wherein the front end of the integral lead-in tube is configured to receive and guide an end portion of an optical fiber along the optical axis through the rear end of the ferrule holder body and into the internal passage of the ferrule holder body and into the rear end of the ferrule,
      wherein the integral lead-in tube is integrated into the ferrule holder body through a bond, and
      wherein the rear end of the ferrule holder body includes an outer surface, and an inner lead-in surface of the integral lead-in tube at least partially encapsulates the outer surface.

22. A method of manufacturing a fiber optic connector sub-assembly as part of a fiber optic connector, comprising:
   providing a ferrule holder body comprising a front end opposite a rear end along an optical axis, an internal passage therethrough extending along the optical axis from the rear end of the ferrule holder body to the front end of the ferrule holder body,
   overmolding an integral lead-in tube upon the rear end of the ferrule holder body to form a ferrule holder with the integral lead-in tube which is integrated with the rear end of the ferrule holder body, the integral lead-in tube including an inner lead-in surface forming a lead-in bore;
   receiving a portion of a ferrule in the internal passage; and
   receiving the ferrule holder within an inner housing.

* * * * *